US010575682B2

(12) United States Patent
Lim et al.

(10) Patent No.: US 10,575,682 B2
(45) Date of Patent: Mar. 3, 2020

(54) STIRRING AND COOKING ASSEMBLY AND COOKING EQUIPMENT INCLUDING SAME

(71) Applicant: SAMSUNG ELECTRONICS CO., LTD., Suwon-si (KR)

(72) Inventors: Gyu Sik Lim, Suwon-si (KR); Jong Hoon Lee, Uiwang-si (KR); Sun Hee Koo, Seoul (KR); Jeong Hee Lee, Hwaseong-si (KR); Hong Man Chang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 253 days.

(21) Appl. No.: 15/301,545

(22) PCT Filed: Mar. 23, 2015

(86) PCT No.: PCT/KR2015/002810
§ 371 (c)(1),
(2) Date: Oct. 3, 2016

(87) PCT Pub. No.: WO2015/152549
PCT Pub. Date: Oct. 8, 2015

(65) Prior Publication Data
US 2017/0020338 A1 Jan. 26, 2017

(30) Foreign Application Priority Data

Apr. 3, 2014 (KR) .................. 10-2014-0039909
Oct. 6, 2014 (KR) .................. 10-2014-0134338

(51) Int. Cl.
H05B 6/80 (2006.01)
A47J 43/044 (2006.01)
(Continued)

(52) U.S. Cl.
CPC ......... *A47J 43/044* (2013.01); *A47J 43/0711* (2013.01); *F24C 15/16* (2013.01); *H05B 6/6408* (2013.01)

(58) Field of Classification Search
CPC ........ A47J 43/044; A47J 43/07; A47J 43/071; A47J 43/082; A47J 36/027; A47J 36/10;
(Continued)

(56) References Cited

U.S. PATENT DOCUMENTS 4,773,317 A    9/1988  Wickboldt, Jr.
4,952,069 A *  8/1990  Boulard .............. B01F 7/00208
                                                         219/726

(Continued)

FOREIGN PATENT DOCUMENTS

DE    102005016179        10/2006
DE    102005016179 A1 *  10/2006  ............ C47J 36/027

(Continued)

OTHER PUBLICATIONS

Chinese Office Action dated Apr. 4, 2018 in Chinese Patent Application No. 201580029487.9.

(Continued)

*Primary Examiner* — Hung D Nguyen
(74) *Attorney, Agent, or Firm* — Staas & Halsey LLP

(57) ABSTRACT

A cooking device includes a cooking chamber configured to provide a space in which food is cooked; a tray located at a bottom surface of the cooking chamber, and connected to a drive member generating rotational force; and an agitating cooking assembly supported by the tray and rotatable with the tray. The agitating cooking assembly, having an improved structure configured to cook food while simultaneously agitating the food, includes: a cooking container configured to store food therein; an agitating member configured to agitate the food while simultaneously relatively (Continued)

rotating in the cooking container with respect to the cooking container; and a stopper located at a rotation path of the agitating member in a manner that the agitating member relatively rotates with respect to the cooking container.

18 Claims, 19 Drawing Sheets

(51) Int. Cl.
*A47J 43/07* (2006.01)
*F24C 15/16* (2006.01)
*H05B 6/64* (2006.01)
*H05B 6/74* (2006.01)

(58) Field of Classification Search
CPC ..... A47J 36/165; A47J 43/0711; F24C 15/16; B01F 9/0014; B01F 9/0018; B01F 9/103; B01F 9/125; H05B 6/64; H05B 6/6408; H05B 6/6411; H05B 6/72; H05B 6/745; H05B 6/80
USPC ........ 219/725, 726, 732, 734, 751, 752, 754
See application file for complete search history.

(56) References Cited

U.S. PATENT DOCUMENTS

| | | | | |
|---|---|---|---|---|
| 6,107,615 | A * | 8/2000 | Choi | H05B 6/6411 108/20 |
| 7,053,349 | B2 | 5/2006 | Jeong | |
| 2004/0104219 | A1 * | 6/2004 | Kim | H05B 6/6447 219/685 |
| 2004/0251250 | A1 * | 12/2004 | Haedrich | H05B 6/6411 219/726 |
| 2012/0305549 | A1 | 12/2012 | Wylie | |

FOREIGN PATENT DOCUMENTS

| | | |
|---|---|---|
| DE | 102012101208 | 8/2012 |
| GB | 2159027 | 11/1985 |
| GB | 2230409 A * | 10/1990 ............ A47J 43/044 |
| GB | 2322271 | 8/1998 |
| GB | 2429415 | 2/2007 |
| JP | 58-74134 | 5/1983 |
| JP | 5-1427 | 1/1993 |
| JP | 5-240450 | 9/1993 |
| JP | 2002-471 | 1/2002 |
| JP | 2012-83072 | 4/2012 |
| KR | 10-2005-0074674 | 7/2005 |
| KR | 10-2008-0057748 | 6/2008 |
| WO | 2006/030265 A2 | 3/2006 |
| WO | 2006/030265 A3 | 3/2006 |

OTHER PUBLICATIONS

Australian Office Action dated Jun. 21, 2018 in Australian Patent Application No. 2015242665.
Canadian Office Action dated Jul. 17, 2018 in corresponding Canadian Patent Application No. 2,943,812.
Australian Notice of Acceptance dated Sep. 19, 2018 in corresponding Australian Patent Application No. 2015242665.
European Office Action dated Sep. 13, 2018 in corresponding European Patent Application No. 15772929.4.
International Search Report dated Jun. 9, 2015 in corresponding International Application No. PCT/KR2015/002810.
Australian Examination Report dated Jan. 25, 2018 in Australian Patent Application No. 2015242665.
Extended European Search Report dated Oct. 27, 2017 in European Patent Application No. 15772929.4.
Canadian Office Action dated Oct. 23, 2017 in Canadian Patent Application No. 2,943,812.
Chinese Office Action dated Jan. 23, 2019 in Chinese Patent Application No. 201580029487.9.
Canadian Office Action dated Feb. 20, 2019 in Canadian Patent Application No. 2,943,812.
Indian Office Action dated May 16, 2019 in Indian Patent Application No. 201627033018.
Chinese Office Action dated Aug. 9, 2019 in Chinese Patent Application No. 201580029487.9.
European Communication dated Aug. 12, 2019 in European Patent Application No. 15772929.4.

* cited by examiner

[Fig. 1]
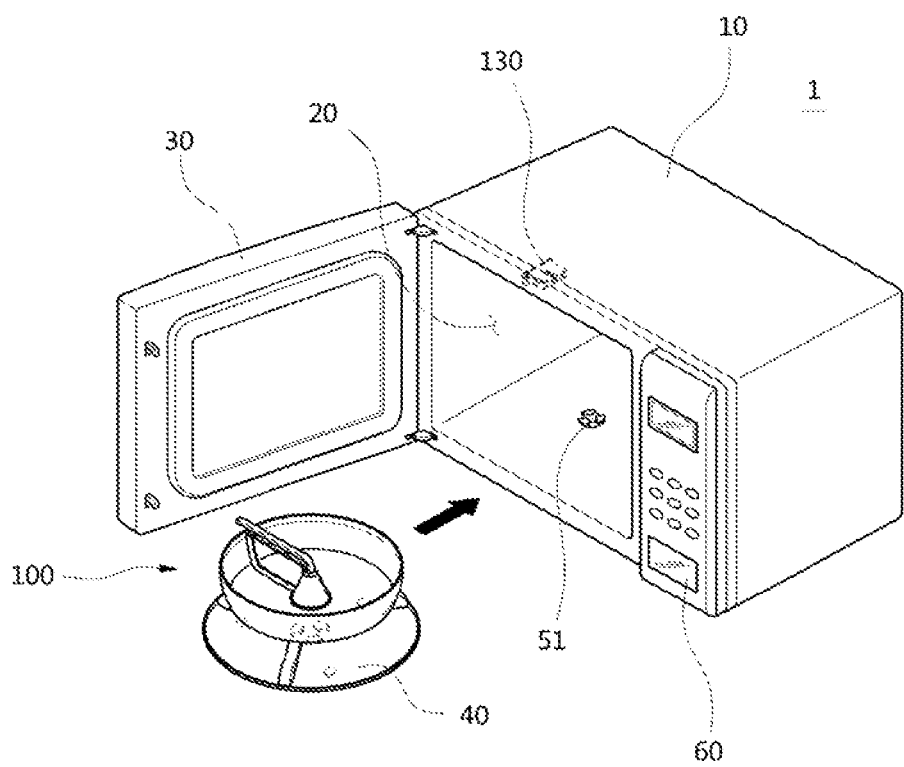

[Fig. 2]
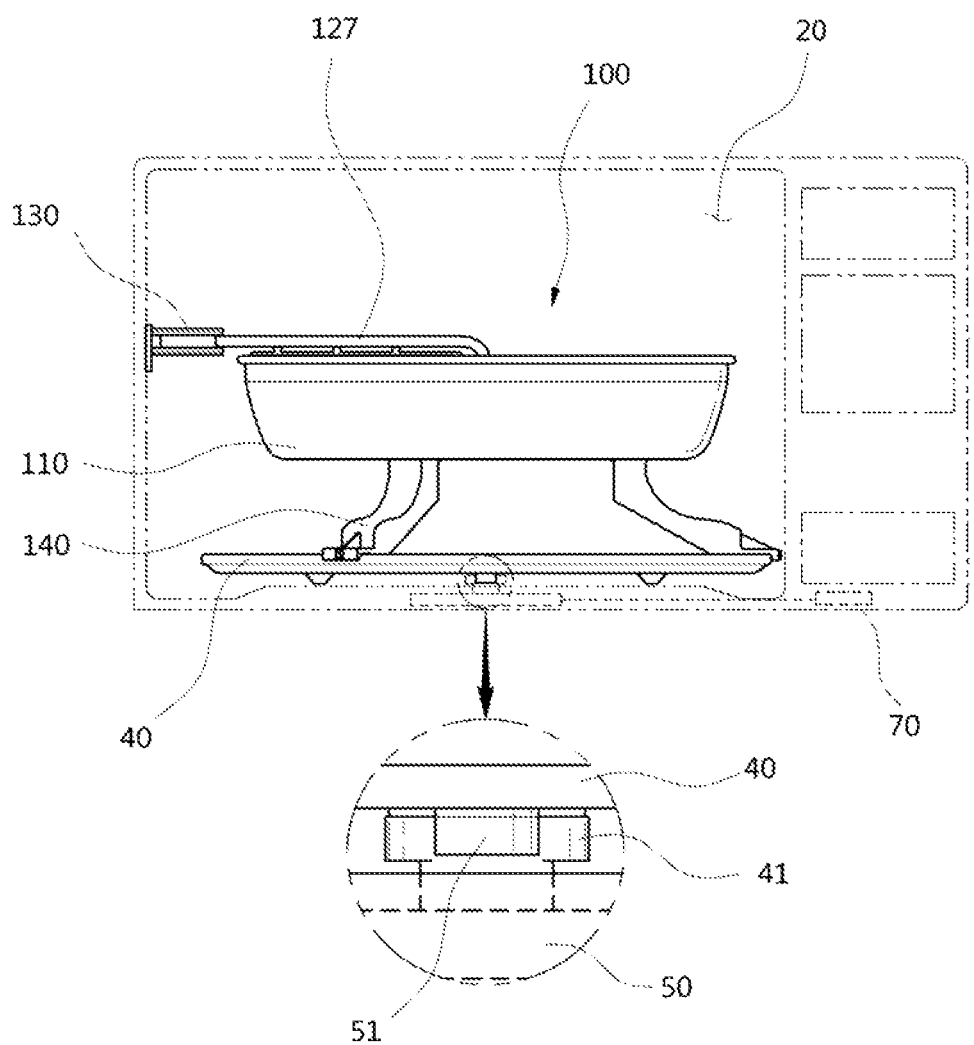

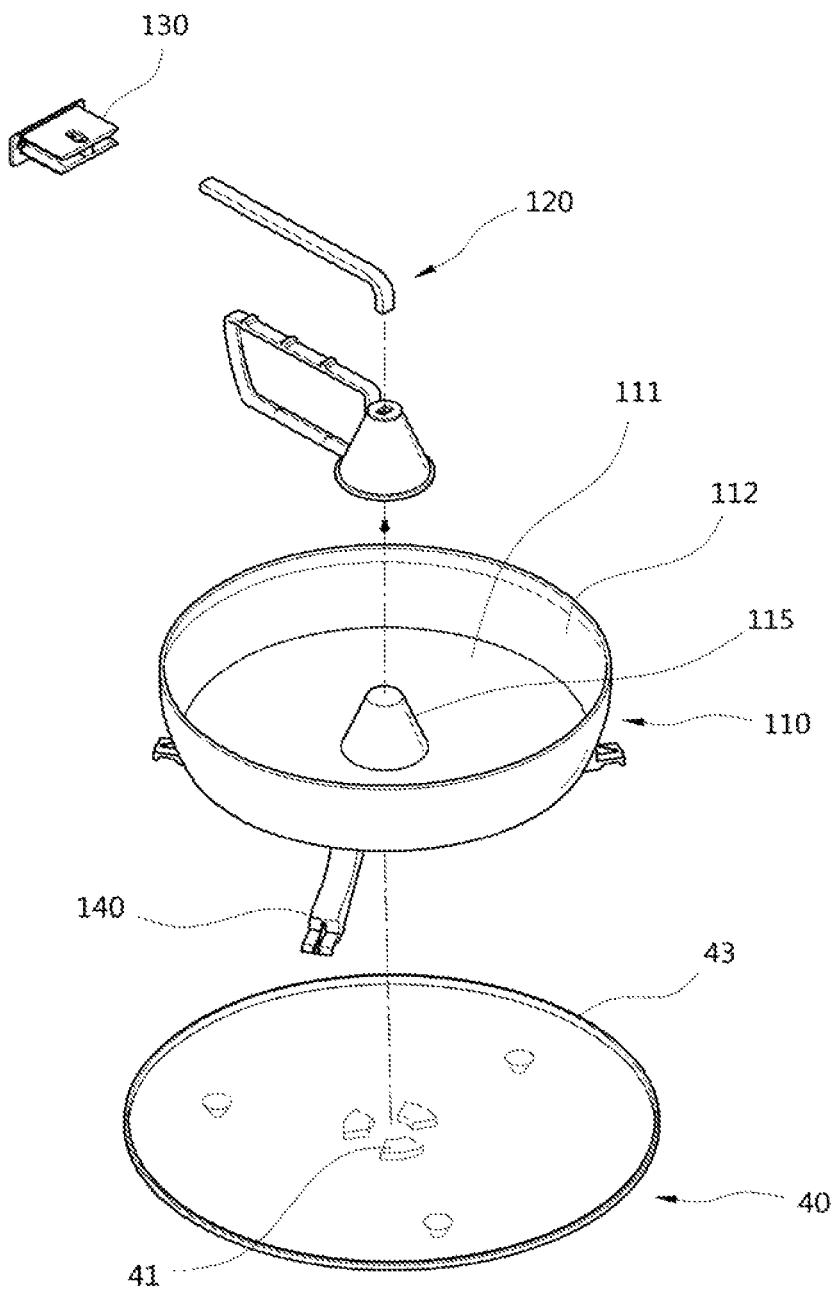
[Fig. 3]

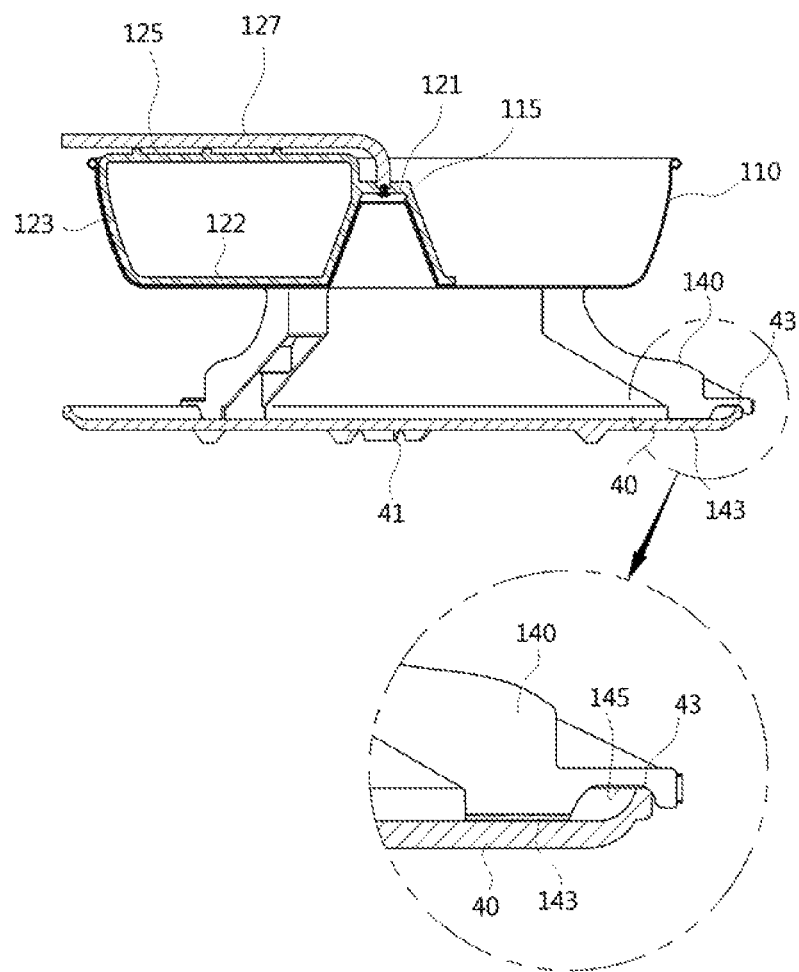
[Fig. 4]

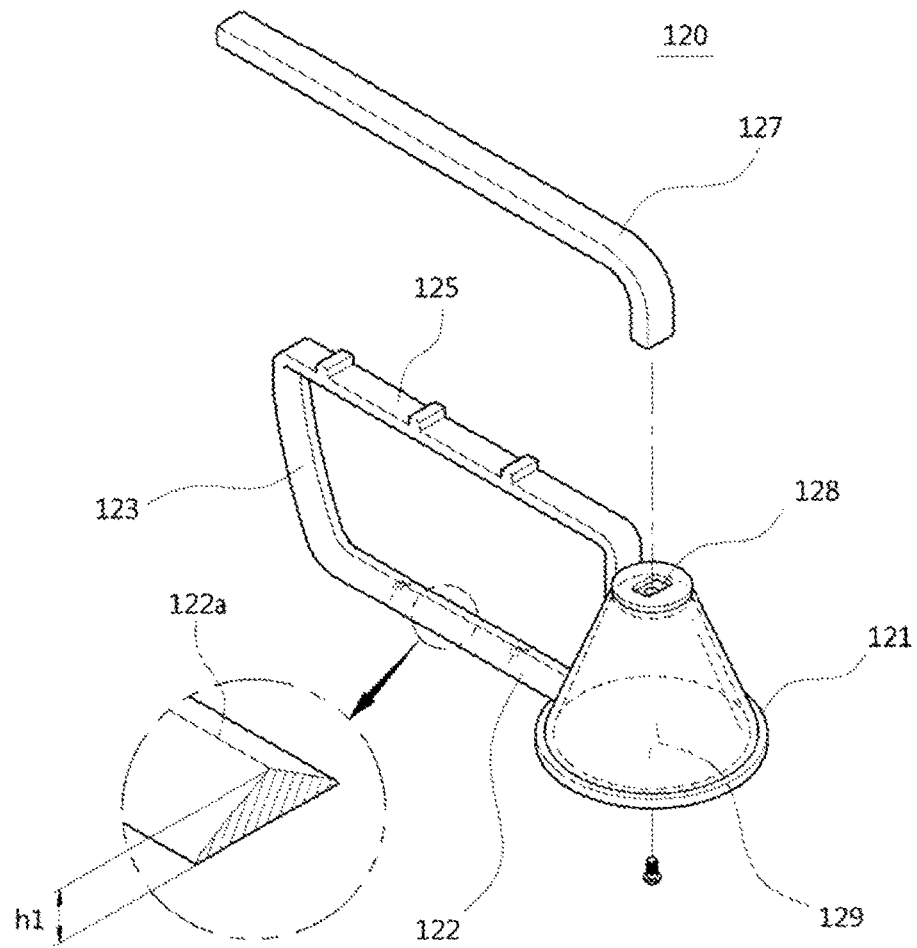
[Fig. 5]

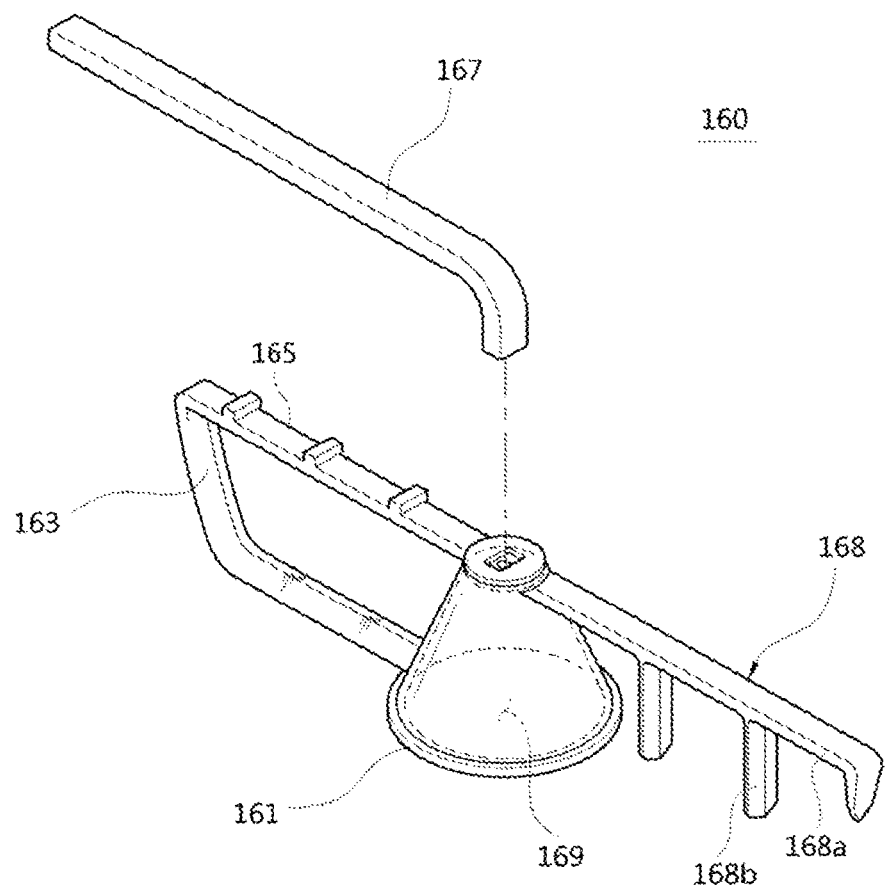

[Fig. 7]
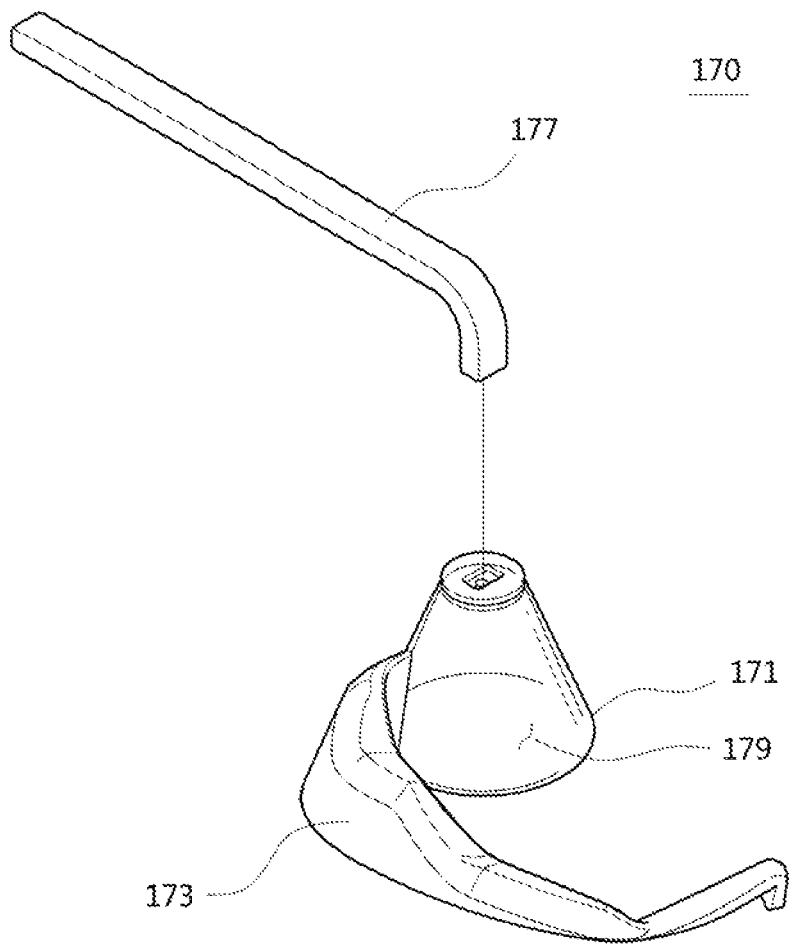

[Fig. 8]
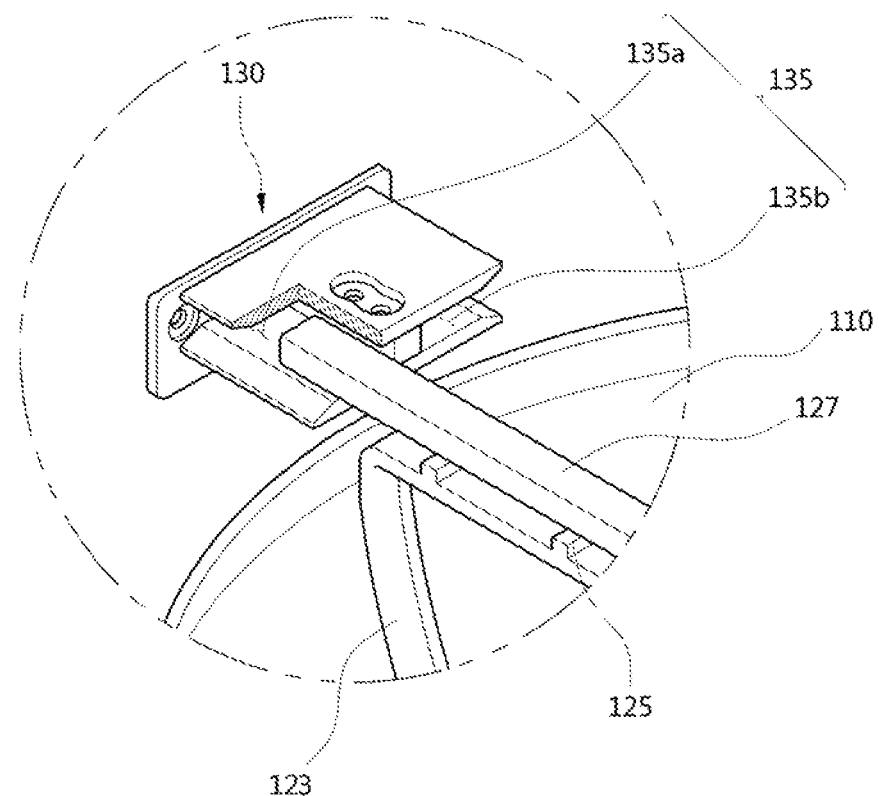
[Fig. 9]
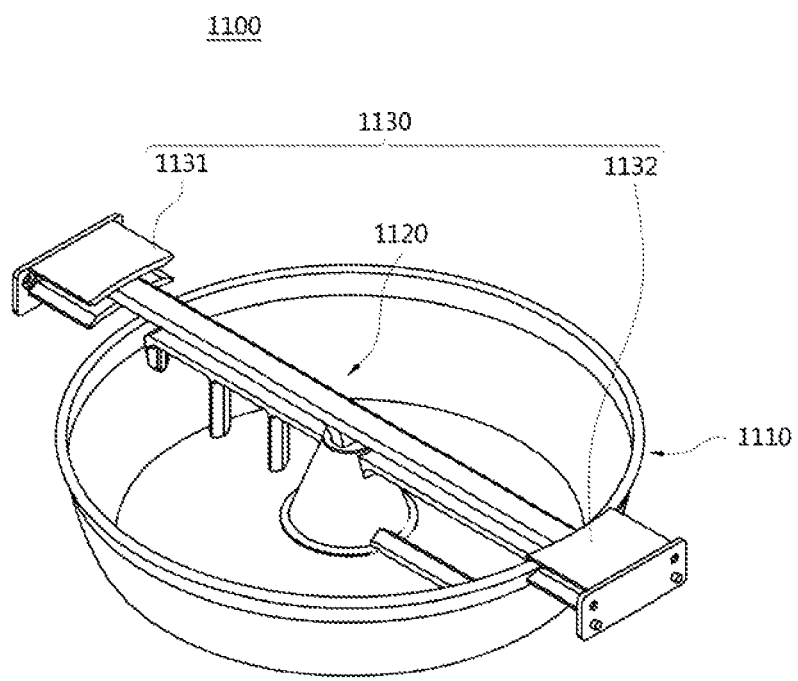

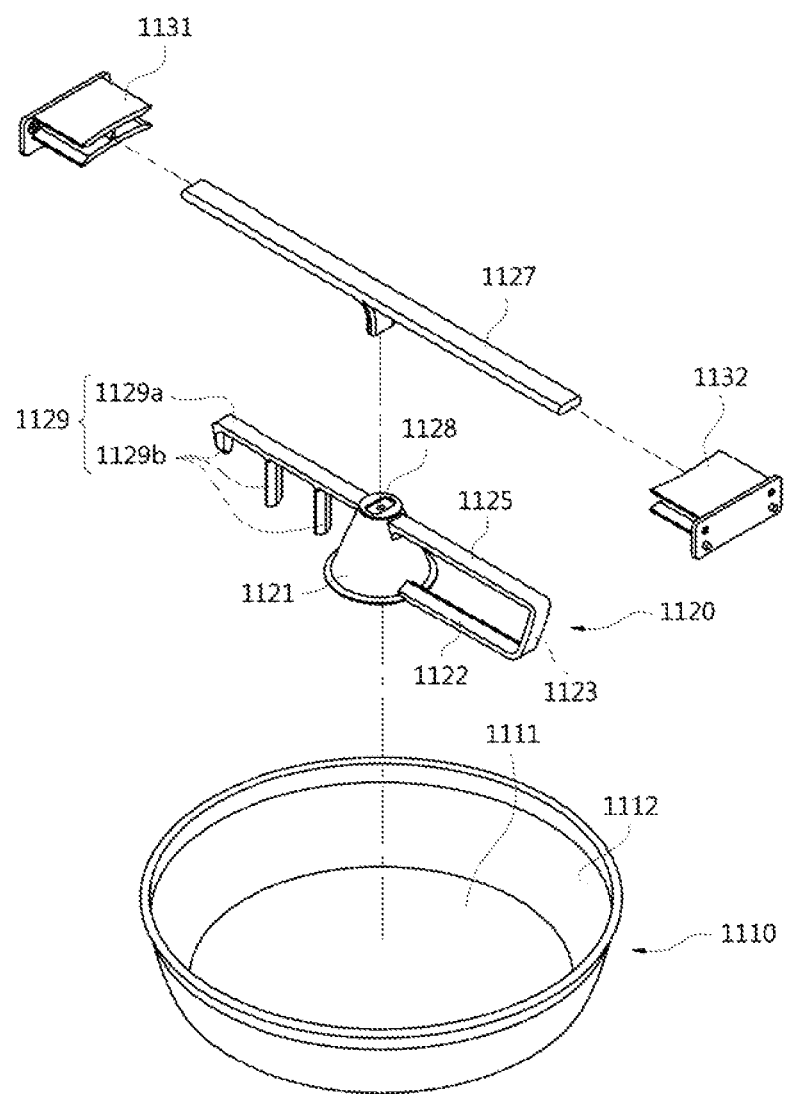
[Fig. 10]

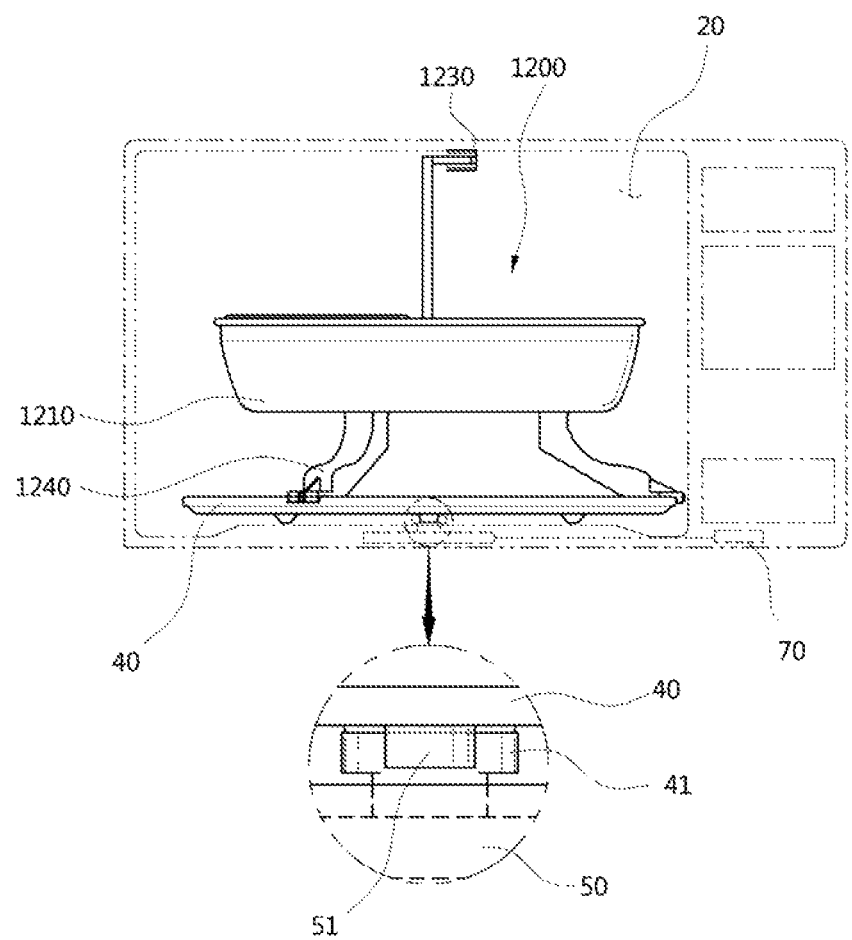
[Fig. 11]

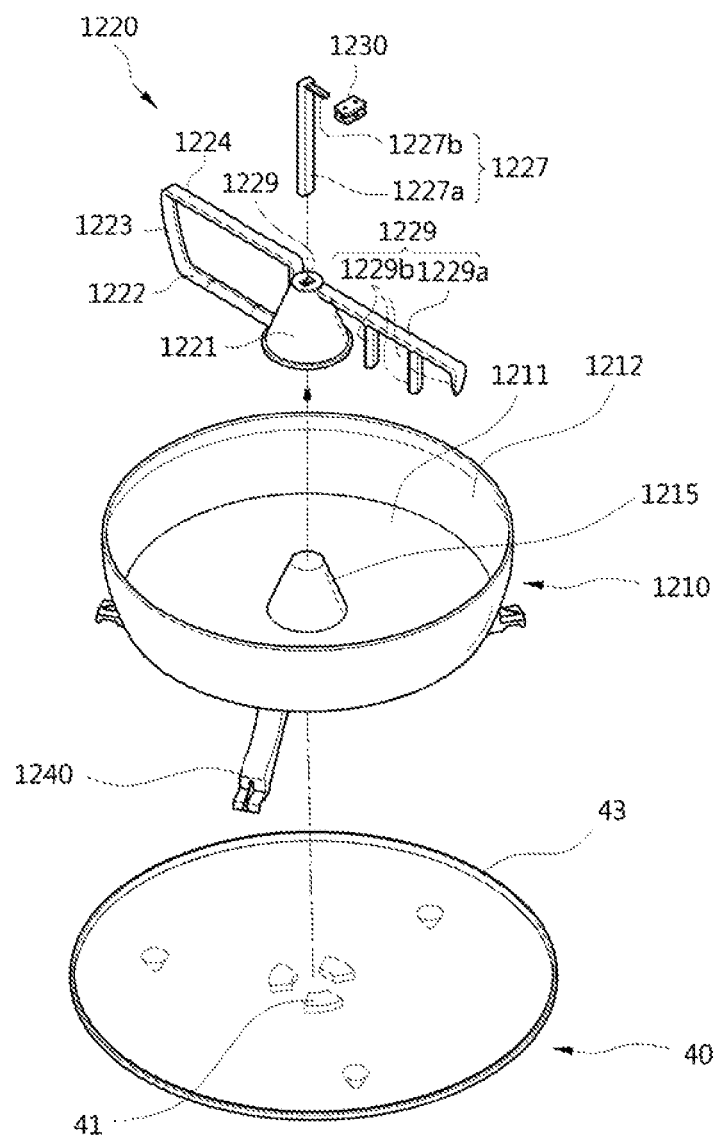
[Fig. 12]

[Fig. 13]
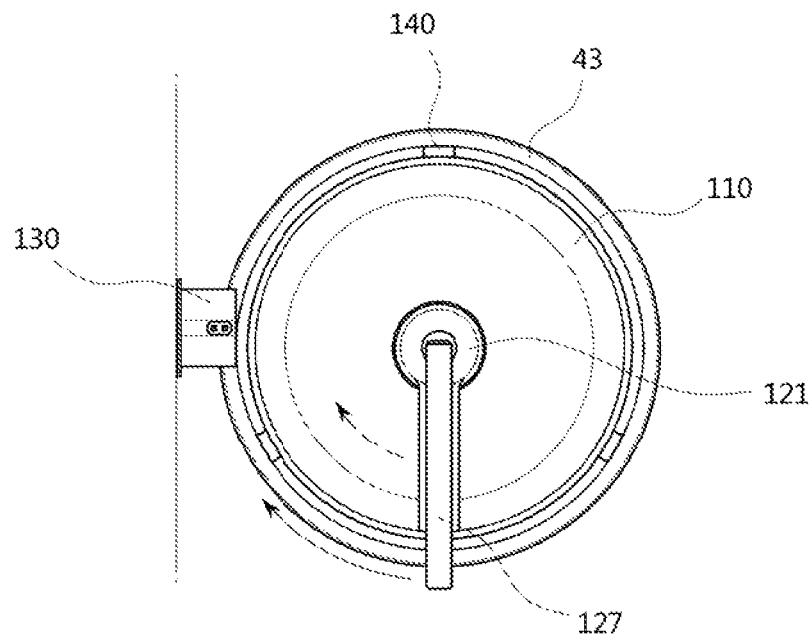
[Fig. 14]
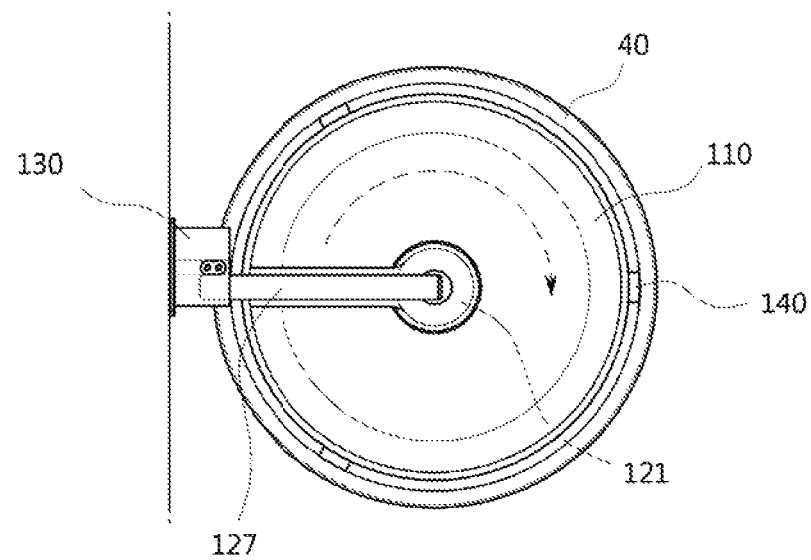

[Fig. 15]
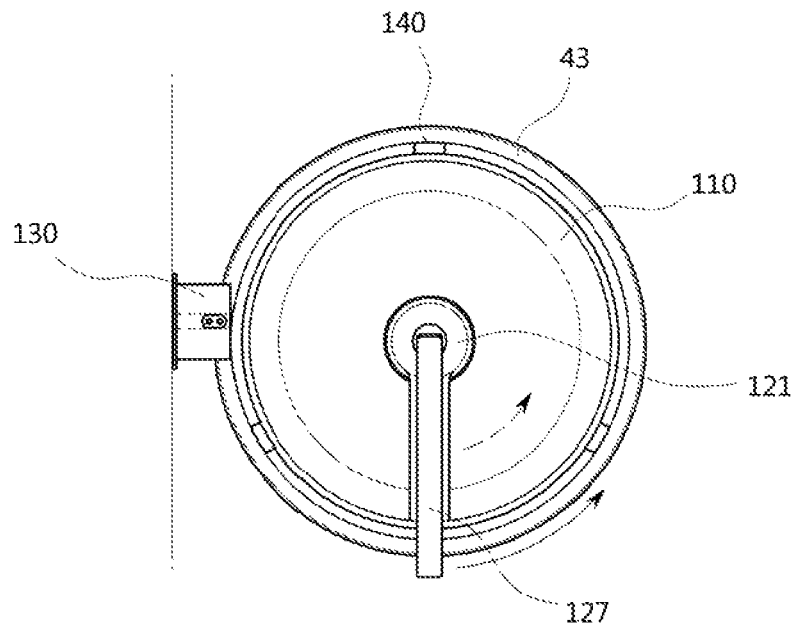
[Fig. 16]
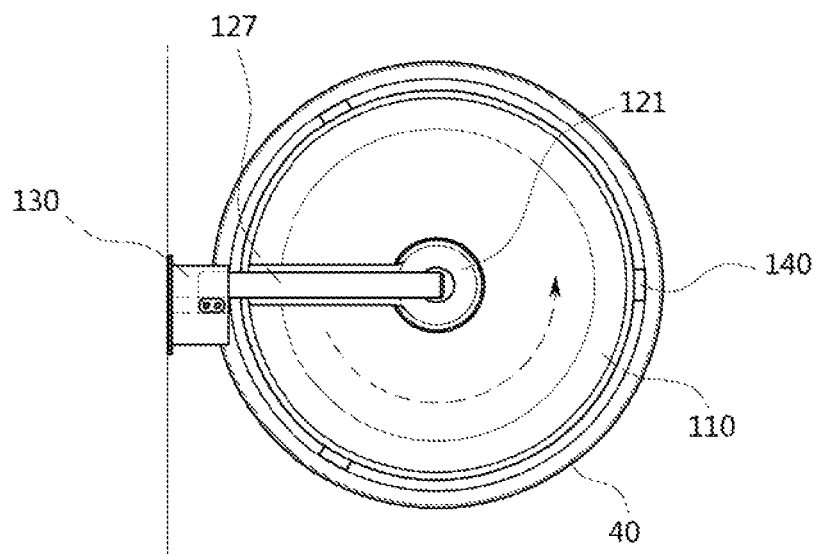

[Fig. 17]
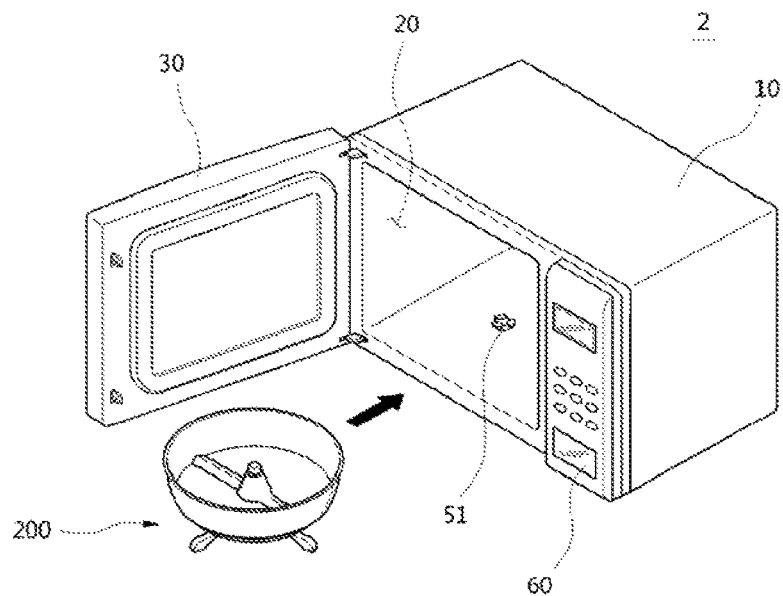
[Fig. 18]
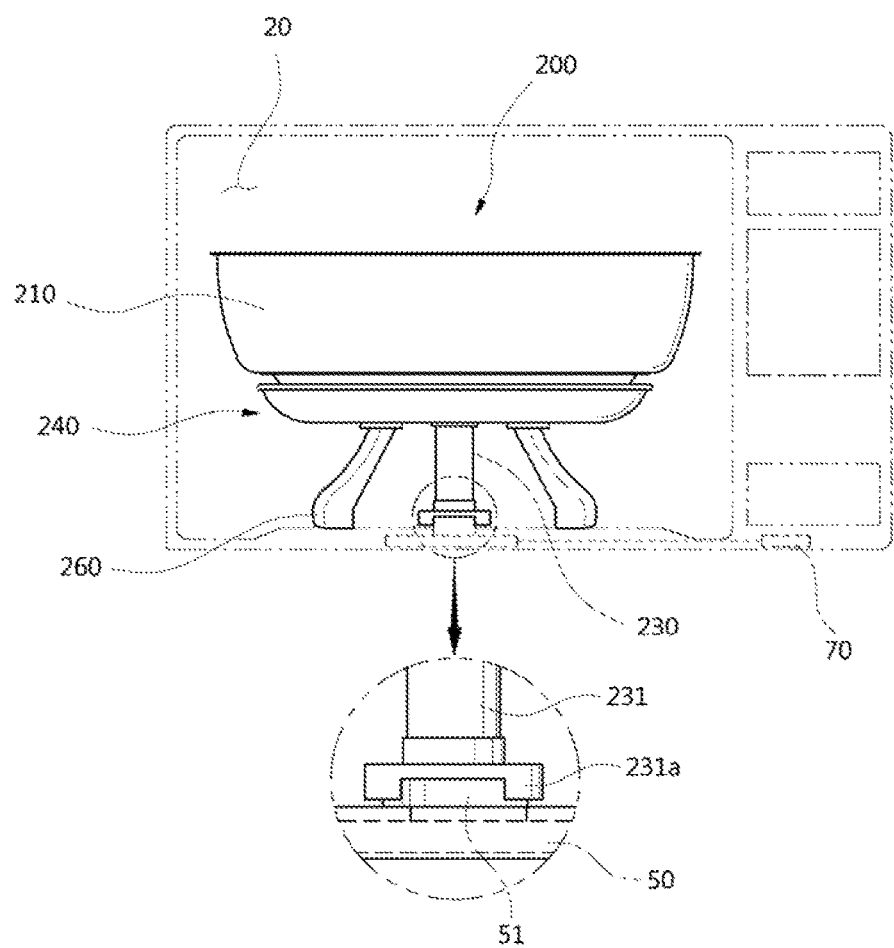

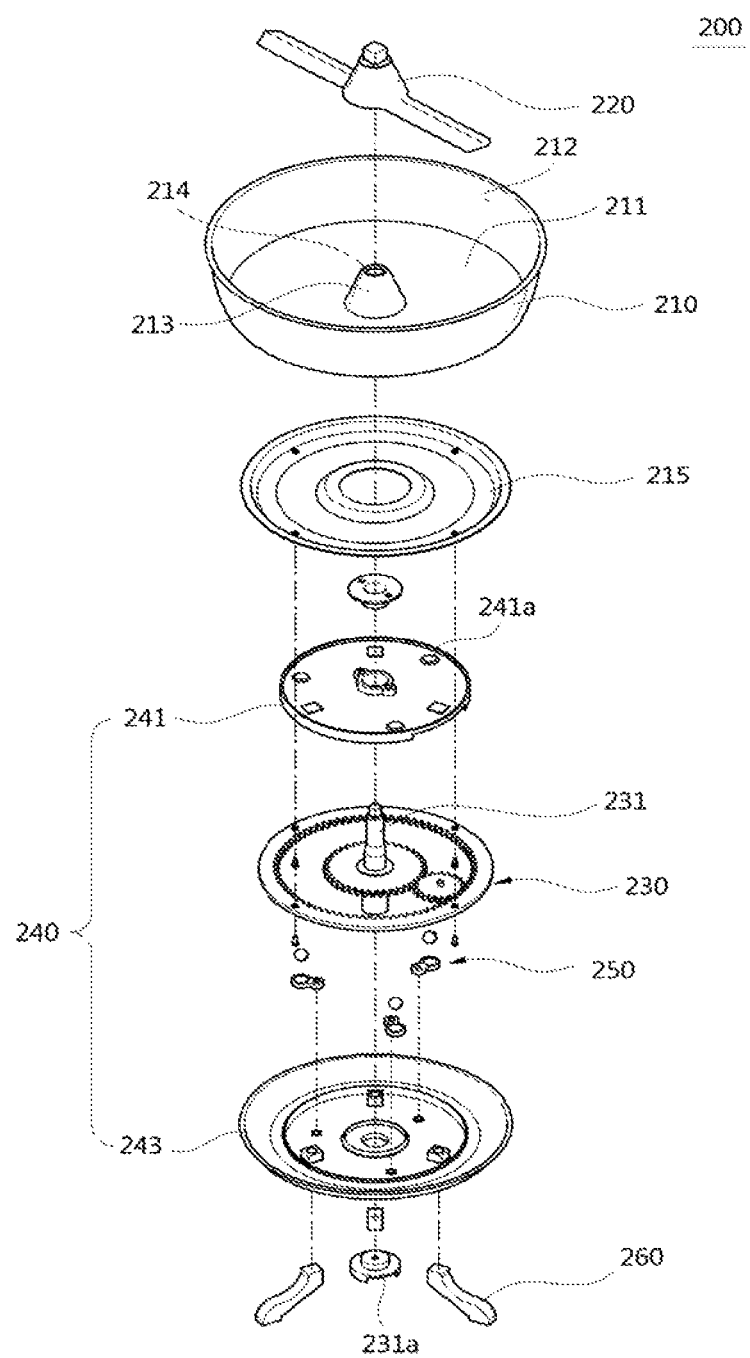

[Fig. 20]
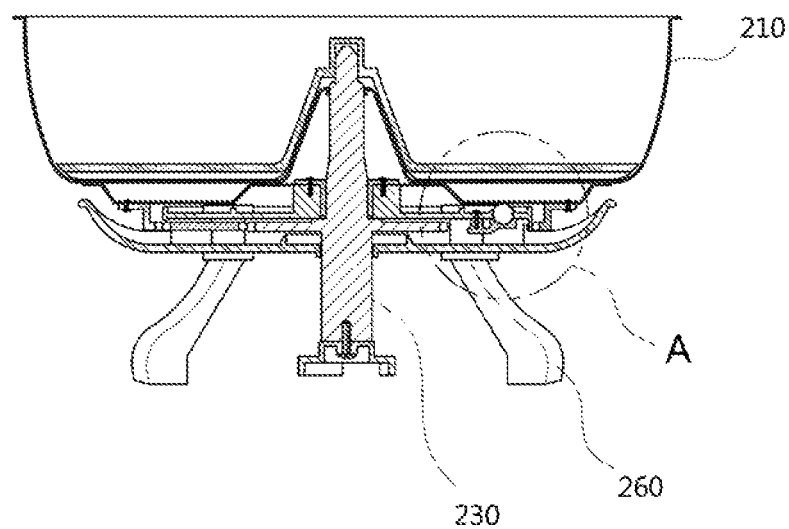
[Fig. 21]
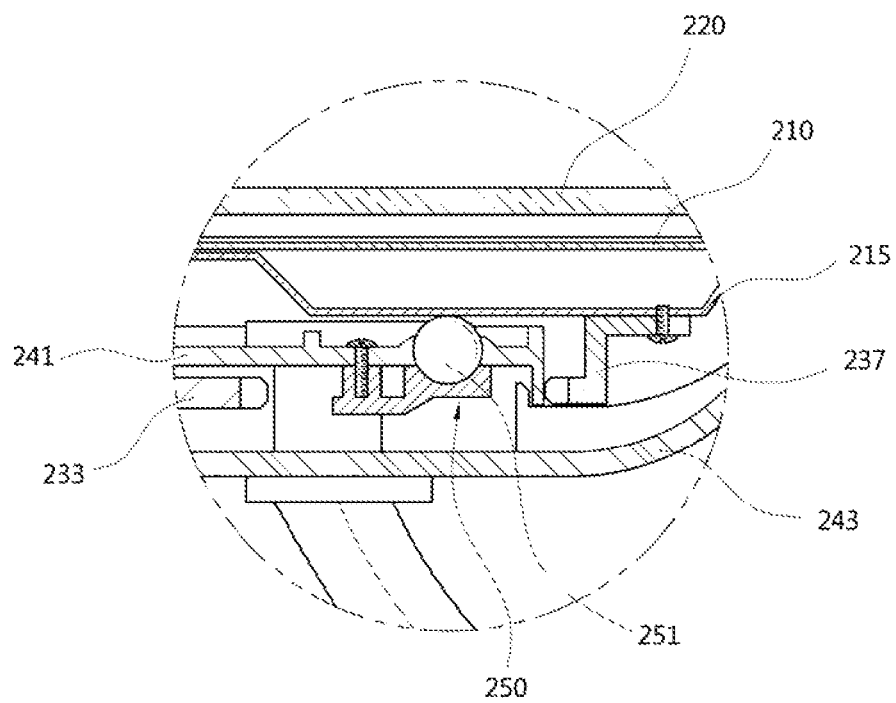

[Fig. 22]
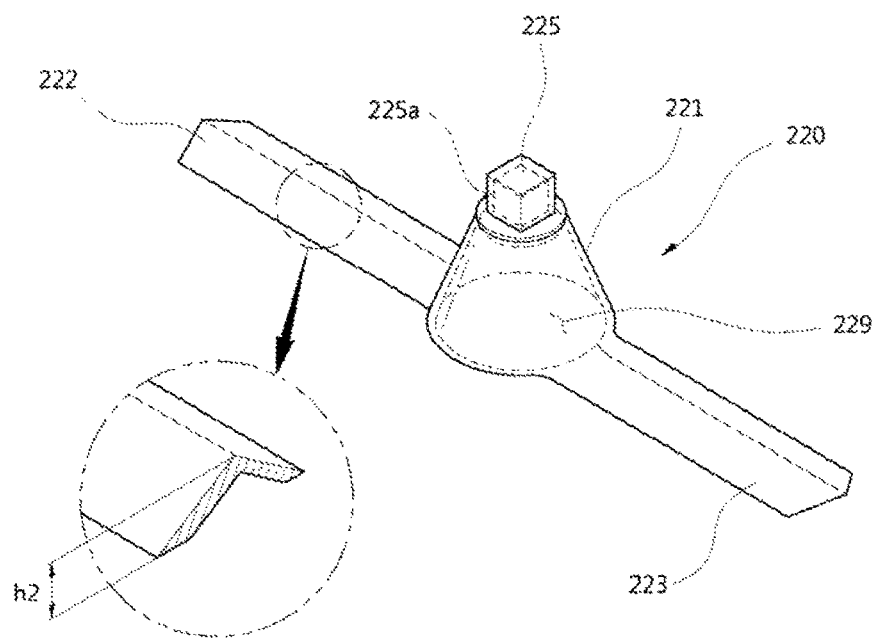

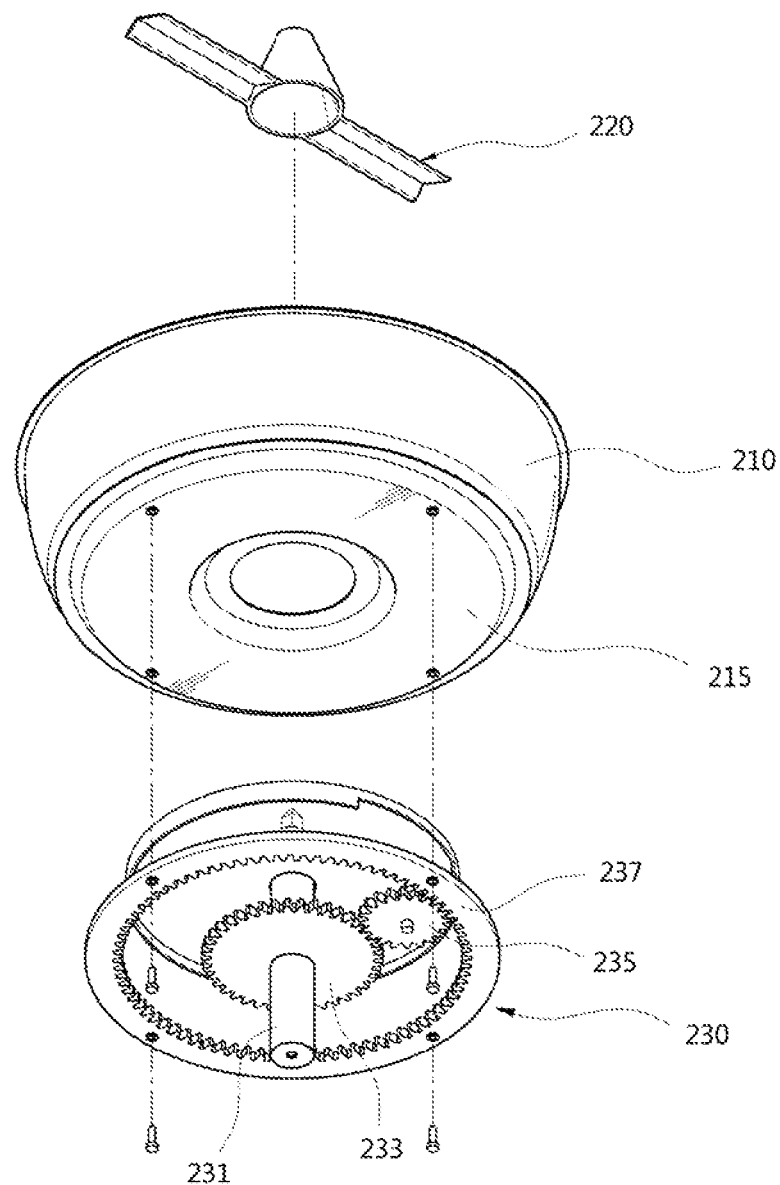
[Fig. 23]

[Fig. 24]
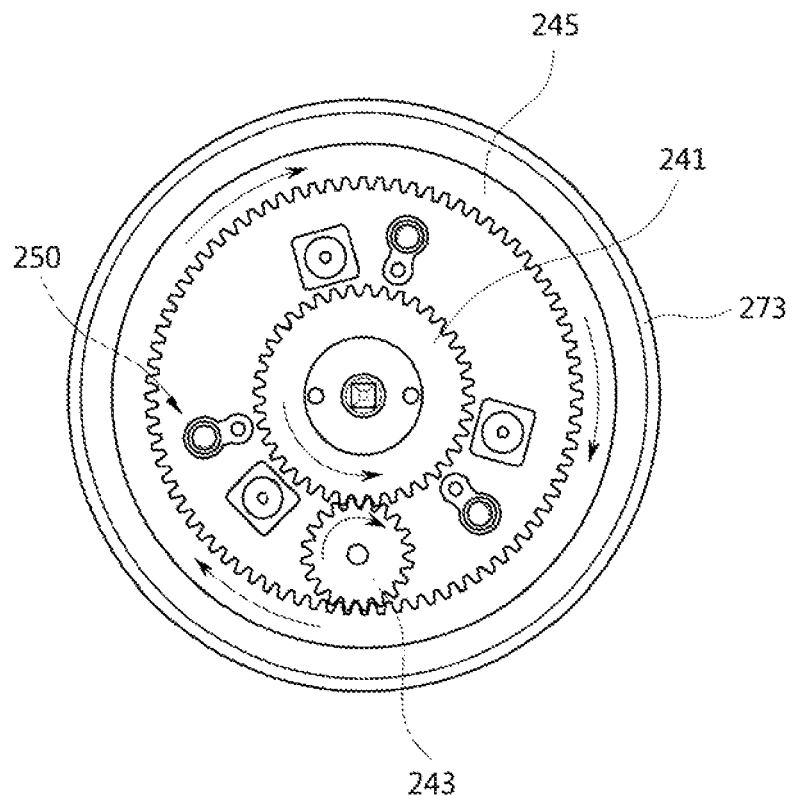
[Fig. 25]
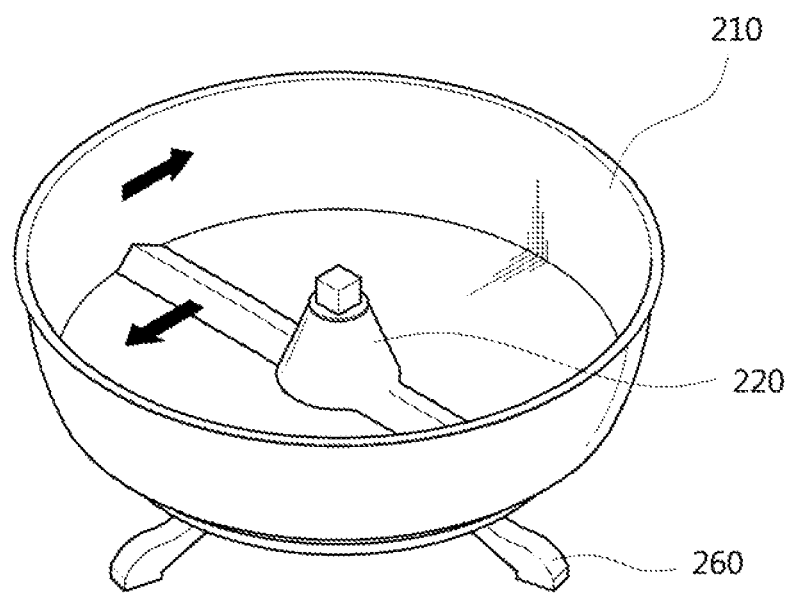

STIRRING AND COOKING ASSEMBLY AND COOKING EQUIPMENT INCLUDING SAME

CROSS-REFERENCE TO RELATED APPLICATIONS

This application is a U.S. National Stage Application, which claims the benefit under 35 U.S.C. § 371 of PCT International Patent Application No. PCT/KR2015/002810, filed Mar. 23, 2015, which claims the foreign priority benefit under 35 U.S.C. § 119 of Korean Patent Application No. 10-2014-0039909, filed Apr. 3, 2014, and Korean Patent Application No. 10-2014-0134338, filed Oct. 6, 2014, the contents of which are incorporated herein by reference.

TECHNICAL FIELD

Embodiments of the present disclosure relate to an agitating cooking assembly for cooking foods while simultaneously agitating the food, and a cooking apparatus including the same.

BACKGROUND ART

Generally, a microwave oven is a cooking device for heating and cooking foods using unique characteristics of microwaves. The microwave oven uniformly heats foods according to the principle of dielectric heating, and thus cooks the food.

In recent times, various cooking devices such as a microwave oven and an oven to cook foods in various ways using radiant heat and convective heat of a heater and microwaves have been developed.

A user puts food into a cooking chamber of the cooking device, and sets a cooking time and a cooking temperature, etc. so as to cook the food. Generally, a rotatable tray is provided at the bottom of the cooking chamber. Thus, the user controls the tray to rotate during cooking of the food, such that the food can be uniformly heated through heat sources including microwaves within the cooking chamber.

DISCLOSURE

Technical Problem

An object of the present disclosure is to provide an agitating cooking assembly having an improved structure to improve cooking performance, and a cooking device including the same.

Another object of the present disclosure is to provide an agitating cooking assembly having an improved structure to cook foods at a uniform temperature, and a cooking device including the same.

Another object of the present disclosure is to provide an agitating cooking assembly having an improved structure to prevent food from being attached to a cooking container in the cooking process, and a cooking device including the same.

Technical Solution

Accordingly, the present disclosure is directed to a refrigerator that substantially obviates one or more problems due to limitations and disadvantages of the related art.

The objects of the present disclosure can be achieved by providing a cooking device including: a cooking chamber configured to provide a space in which food is cooked; a tray located at a bottom surface of the cooking chamber, and connected to a drive member generating rotational force; and an agitating cooking assembly supported by the tray and rotatable with the tray. The agitating cooking assembly includes: a cooking container configured to store food therein; an agitating member configured to agitate the food while simultaneously relatively rotating in the cooking container with respect to the cooking container; and a stopper located at a rotation path of the agitating member in a manner that the agitating member relatively rotates with respect to the cooking container.

The agitating member may include: a connection part connected to one side of the cooking container; and a first agitating part configured to extend from the connection part to an edge region of a bottom surface of the cooking container.

The cooking container may include a protrusion part installed at a center region of the bottom surface. The connection part may include an insertion groove shaped in response to the protrusion part at a bottom surface of the connection part. The protrusion part may be inserted into the insertion groove such that the agitating member relatively rotates with respect to the cooking container.

The first agitating part may contact the bottom surface of the cooking container.

The first agitating part may be formed in a tilted shape in a manner that the first agitating part is gradually increased in height in proportion to the increasing distance from both sides of the first agitating part to a center part of the first agitating part.

The agitating member may further include: a second agitating part configured to extend upward from the first agitating part along an inner side surface of the cooking container.

The agitating member may further include: a supporter, one side of which is coupled to the connection part and the other side extends to one side surface of the cooking chamber. The stopper may be located at a rotation path of the supporter.

The stopper, one side of which is installed at one sidewall of the cooking chamber and the other side is located at a rotation path of the supporter, may be provided.

The agitating member may further include: a third agitating part configured to connect a second agitating part to the connection part so as to support the supporter.

The agitating cooking assembly may further include: a plurality of legs installed at a bottom surface of the cooking container so as to support the cooking container.

The tray may include a guide part in an edge region; each of the legs may include a tray seating part concaved upward at a bottom surface of each leg; and each of the legs may be provided in a manner that the guide part is located in the tray seating part.

The stopper may include a seating part in which some parts of the corresponding to the supporter, and one side surface of the inner space may be formed to be opened.

The agitating member may be detachably coupled to the cooking container.

The cooking device may further include a controller configured to adjust rotation of the tray, wherein the controller controls a rotation speed and a rotation time of the tray.

In accordance with another aspect of the present disclosure, an agitating cooking assembly includes: a cooking container configured to include a space in which food is stored, and receive rotational force from an external part; an agitating member configured to relatively rotate in the cooking container with respect to the cooking container so as to agitate the food; and a stopper located in a rotation path of the agitating member so as to limit rotation of the agitating member.

The agitating member may include: a connection part connected to one side of the cooking container; and a first agitating part configured to extend from the connection part to an edge region of a bottom surface of the cooking container.

The cooking container may include a protrusion part installed at a center region of the bottom surface; the connection part may include an insertion groove shaped in response to the protrusion part at a bottom surface of the connection part; and the protrusion part may be inserted into the insertion groove such that the agitating member relatively rotates with respect to the cooking container.

The first agitating part may contact the bottom surface of the cooking container.

The first agitating part may be formed in a tilted shape in a manner that the first agitating part is gradually increased in height in proportion to the increasing distance from both sides of the first agitating part to a center part.

The agitating member may further include: a second agitating part configured to extend upward from the first agitating part along an inner side surface of the cooking container.

The agitating member may further include: a supporter, one side of which is coupled to the connection part and the other side extends to an outer surface of the cooking container, from a top view of the agitating member, wherein the stopper is located at a rotation path of the supporter.

The agitating cooking assembly may further include: a plurality of legs installed at a bottom surface of the cooking container so as to support the cooking container.

The agitating member may be detachably coupled to the cooking container according to a cooking mode.

In accordance with another aspect of the present disclosure, a cooking device includes: a cooking chamber; a cooking container configured to store food therein, and arranged in the cooking chamber; an agitating member configured to agitate the food while simultaneously relatively rotating with respect to the cooking container, and configured to be selectively mounted to the inside of the cooking chamber; and a drive member configured to transmit rotational force to at least one of the cooking container and the agitating member.

The agitating member may include: an agitating part configured to extend from a center part of the cooking container to an edge region of the cooking container, wherein the agitating part is formed in a tilted shape in a manner that the agitating part is gradually increased in height in proportion to the increasing distance from both sides of the agitating part to a center part of the agitating part.

The cooking container may be detachably coupled to the inside of the cooking chamber.

In accordance with another aspect of the present disclosure, a cooking device includes: a cooking chamber configured to provide a space in which food is cooked; a tray located at a bottom surface of the cooking chamber, and connected to a drive member generating rotational force; and an agitating cooking assembly supported by the tray and rotatable with the tray, wherein the agitating cooking assembly includes: a cooking container configured to store food therein; an agitating member configured to agitate the food in the cooking container; and a stopper located at a rotation path of the agitating member so as to limit rotation of the agitating member, wherein, under the condition that the agitating member rotates along with the cooking container and rotation of the agitating member is limited by the stopper, the agitating member is configured to agitate the food rotating along with the cooking container.

In accordance with another aspect of the present disclosure, a cooking device includes: a cooking chamber; a tray located at a bottom surface of the cooking chamber, and connected to a drive member generating rotational force; and an agitating cooking assembly supported by the tray and rotatable with the tray, wherein the agitating cooking assembly includes: a cooking container configured to store food therein; an agitating member configured to agitate the food in the cooking container; and a stopper located at a rotation path of the agitating member so as to limit rotation of the agitating member, wherein the cooking container is coupled to the agitating member and at the same time is put into or taken out of the cooking chamber.

Advantageous Effects

As is apparent from the above description, the agitating cooking assembly according to the embodiments can improve the cooking performance of the cooking device.

The agitating cooking assembly according to the embodiments can prevent foods from being attached to the cooking container during the cooking process.

The agitating cooking assembly according to the embodiments can control solid or liquid foods to be uniformly cooked.

DESCRIPTION OF DRAWINGS

The accompanying drawings, which are included to provide a further understanding of the invention, illustrate embodiments of the invention and together with the description serve to explain the principle of the invention.

FIG. 1 is a perspective view illustrating a cooking device according to an embodiment of the present disclosure.

FIG. 2 is a front view illustrating an agitating cooking assembly of the cooking device shown in FIG. 1 according to an embodiment of the present disclosure.

FIG. 3 is an exploded perspective view illustrating an example of an agitating cooking assembly of the cooking device shown in FIG. 1.

FIG. 4 is a cross-sectional view illustrating the agitating cooking assembly shown in FIG. 2.

FIG. 5 is a perspective view illustrating one example of an agitating member of the agitating cooking assembly shown in FIG. 2.

FIG. 6 is a perspective view illustrating another example of an agitating member of the agitating cooking assembly shown in FIG. 2.

FIG. 7 is a perspective view illustrating still another example of an agitating member of the agitating cooking assembly shown in FIG. 2.

FIG. 8 is a view illustrating a stopper for use in the agitating cooking assembly shown in FIG. 2.

FIG. 9 is a perspective view illustrating a first modified example of the agitating cooking assembly according to an embodiment of the present disclosure.

FIG. 10 is an exploded perspective view illustrating the agitating cooking assembly shown in FIG. 9.

FIG. 11 is a front view illustrating a second modified example of the agitating cooking assembly according to an embodiment of the present disclosure.

FIG. 12 is an exploded perspective view illustrating the agitating cooking assembly shown in FIG. 11.

FIGS. 13 to 16 are conceptual diagrams illustrating a method for allowing the agitating cooking assembly of FIG. 2 to agitate foods.

FIG. 17 is a perspective view illustrating a cooking device according to another embodiment of the present disclosure.

FIG. 18 is a front view illustrating one example of the agitating cooking assembly of the cooking device shown in FIG. 17.

FIG. 19 is an exploded perspective view illustrating one example of the agitating cooking assembly of the cooking device shown in FIG. 17.

FIG. 20 is a cross-sectional view illustrating the agitating cooking assembly shown in FIG. 18.

FIG. 21 is an enlarged view illustrating the region "A" of the agitating cooking assembly shown in FIG. 20.

FIG. 22 is a view illustrating an agitating member of the agitating cooking assembly shown in FIG. 18.

FIG. 23 is a conceptual diagram illustrating that a rotation transfer unit of the agitating cooking assembly shown in FIG. 18 is connected to the cooking container and the agitating member.

FIG. 24 is a conceptual diagram illustrating the operation of a rotation transfer unit for use in the agitating cooking assembly shown in FIG. 18.

FIG. 25 is a conceptual diagram illustrating a method for allowing the agitating cooking assembly of FIG. 18 to agitate foods.

BEST MODE

Reference will now be made in detail to the embodiments of the present disclosure, examples of which are illustrated in the accompanying drawings, wherein like reference numerals refer to like elements throughout.

The cooking device according to the present disclosure can be applied to all kinds of cooking devices configured to cook foods using at least one of microwaves, radiant heat generated from a heater, and convective heat. In more detail, the cooking device according to the present disclosure includes a microwave oven, an electric oven, a multi-functional oven, etc. The following embodiments will hereinafter be described on the assumption that the cooking device is a microwave oven for convenience of description and better understanding of the present disclosure.

FIG. 1 is a perspective view illustrating a cooking device according to an embodiment of the present disclosure. FIG. 2 is a front view illustrating an agitating cooking assembly of the cooking device shown in FIG. 1 according to an embodiment of the present disclosure.

Referring to FIGS. 1 and 2, the cooking device 1 according to the embodiment may include a main body 10 and a cooking chamber 20. The main body 10 may form the external appearance of the cooking device 1. The main body 10 may include a cooking chamber 20 including an inner space.

The cooking chamber 20 may provide a space in which food is cooked to the inside of the main body 10. A front surface of the cooking chamber 20 may be opened such that food can be put into or taken out of the cooking chamber through the opened front surface.

The cooking device 1 may include a door 30 to open or close the cooking chamber 20. One side of the door 30 may be hinged to the front surface of the main body 10 so as to open or close the cooking chamber 20. The door 30 may open or close the cooking chamber 20 while simultaneously rotating about the hinge-coupled side of the door 30.

The cooking device 1 may include a heating unit (not shown). The heating unit may be located in the main body 10, and may be connected to the cooking chamber 20 to heat food stored in the cooking chamber 20. The heating unit may include at least one of a high-frequency heating unit, a convective heating unit, and a radiant heating unit.

The high-frequency heating unit may provide microwaves to the inside of the cooking chamber 20 so that it can heat the stored food. For this purpose, the high-frequency heating unit may include a magnetron to provide microwaves and a high-voltage transformer to provide a high voltage to the magnetron.

The convective heating unit may include a convective heater for performing exothermic action to generate hot air needed to cook foods, and a convection circulation fan for generating convection by allowing air to circulate around the convective heater.

The radiant heating unit may directly supply radiant heat to food so as to cook the food. For this purpose, the radiant heating unit may include a grille heater located at an upper or lower part of the cooking chamber 20.

The cooking device 1 may include a tray 20. The tray 40 may be located at the bottom surface of the cooking chamber 20. The tray 40 may be configured to support either the food provided in the cooking chamber or the cooking utensils. The tray 40 may be separable from the cooking chamber.

In the tray 40, a coupler 41 may be installed at the center part of the bottom surface of the cooking chamber 20. The coupler 41 may be connected to a drive member 50 so as to receive rotational force.

The drive member 50 may be installed at the interior of the bottom surface of the cooking chamber 20. The drive member 50 may include a drive coupler 51 coupled to the coupler 41 of the tray 40. A drive coupler 51 may be exposed to the bottom surface of the cooking chamber 20. The drive coupler 51 may be connected to the coupler 41 of the tray 40 so that it can transfer rotational force to the tray 40.

A guide part (see FIG. 3) may be provided at the edge region of the top surface of the tray 40. The guide part 43 may be formed in a ring shape enclosing the edge region of the tray 40. For example, the guide part 43 may be formed to protrude upward from the tray 40. In contrast, the guide part 43 may be formed in a groove shape at the edge region of the top surface of the tray 40. The guide part 43 may guide the agitating cooking assembly 100 placed on the tray 40.

The cooking device 1 may include a control panel 60. The control panel 60 may be installed at the front surface of the main body 10. The control panel 60 may include a plurality of switches through which the user can select a cooking time, a cooking temperature, a cooking mode, etc. of the cooking device 1. In addition, the control panel 60 may include a display unit for displaying a current state of the cooking device 1. The control panel 60 may transmit input control information to a controller 70, and the controller 70 may control the cooking device 1 according to the received information.

The agitating cooking assembly 100 according to an embodiment of the present disclosure will hereinafter be described. As can be seen from FIGS. 1 and 2, the cooking device 1 may include an agitating cooking assembly 100.

FIG. 3 is an exploded perspective view illustrating an example of the agitating cooking assembly of the cooking device shown in FIG. 1. FIG. 4 is a cross-sectional view illustrating the agitating cooking assembly shown in FIG. 2.

Referring to FIGS. 3 and 4, the agitating cooking assembly 100 may include a cooking container 110. The cooking container 110 may have the space including foods to be cooked by the cooking device 1. The cooking container 110 may have a bottom surface 111 and a side surface 112 extending upward from the edge region of the bottom surface 111. The bottom surface 111 and the side surface 112 may form the space in which food is stored.

For example, a protrusion part 115 may be provided at the bottom surface 111 of the cooking container 110. The protrusion part 115 may be located at the center of the bottom surface 111. The protrusion part 115 may be coupled to some parts of the agitating member 120 so as to connect the cooking container 110 to the agitating member 120. In addition, the protrusion part 115 may allow the agitating member 120 to rotate around the protrusion part 115 with respect to the cooking container 110.

For example, the protrusion part 115 may be formed in a circular cone shape. In other words, a cross-sectional view of the protrusion part 115 may be gradually reduced in an upward direction thereof. In contrast, the protrusion part 115 may also be formed in a cylindrical shape having the same cross-sectional view.

The agitating cooking assembly 100 may further include the agitating member 120. The agitating member 120 may rotate in the cooking container 110 with respect to the cooking container 110. The agitating member 120 may rotate with respect to the cooking container 110, and at the same time may agitate the food stored in the cooking container 110. For example, the agitating member 120 may remain stopped at a specific position when the cooking container 110 rotates.

FIG. 5 is a perspective view illustrating one example of the agitating member of the agitating cooking assembly shown in FIG. 2.

Referring to FIGS. 3 to 5, the agitating member 120 according to the embodiment may include a connection part 121 and a first agitating part 122.

The connection part 121 may be connected to one side of the cooking container 110. In more detail, the connection part 121 may be rotatably coupled to the protrusion part 115 of the cooking container 110.

Referring FIGS. 4 and 5, an insertion groove 129 may be provided at the bottom surface of the connection part 121. The insertion groove 129 may be formed to have a shape corresponding to the protrusion part 115 in such a manner that the protrusion part 115 is inserted into the insertion groove 115 and coupled thereto. The connection part 121 may be detachably coupled to the protrusion part 115. Therefore, the agitating member 120 may be replaced with various shapes of the agitating member 120 by user selection according to food types, cook types, etc. such that it can be used to cook foods.

The first agitating part 122 may be connected to the connection part, and may agitate the foods stored in the cooking container 110 while simultaneously rotating along with the connection part 121. For example, the first agitating part 122 may extend from the connection part 121 to the edge region of the bottom surface 111 of the cooking container 110. In other words, the first agitating part 122 may extend from the center region of the bottom surface 111 of the cooking container 110 to the edge region in a radial direction of the cooking container 110.

For example, as shown in FIG. 4, the first agitating part 122 may contact the bottom surface 111 of the cooking container 110. The first agitating part 122 contacting the bottom surface 111 of the cooking container 110 may extend from the center region of the bottom surface 111 to the edge region. As a result, the first agitating part 122 contacting the bottom surface 111 of the cooking container 110 may rotate in the cooking container 110. Therefore, the first agitating part 122 may agitate solid food and liquid food in a manner that the solid and liquid foods are not attached to the bottom surface 111 of the cooking container 110, thereby cooking the solid and liquid foods.

Referring to FIG. 5, the first agitating part 122 may be formed in a tilted shape in a manner that the first agitating part 122 is gradually increased in height in proportion to the increasing distance from each of both sides of the first agitating part 122 to the center part 122a. In other words, the first agitating part 122 may have a triangular cross-section, and may extend from the connection part 121 to the edge region of the bottom surface of the cooking container 110. In this case, the first agitating part 122 may have a symmetrical shape on the basis of the center part 122a. In more detail, the center part 122a of the first agitating part 122 may have a first height (h1). In this case, the first height (h1) may be 4 mm to 5 mm.

The agitating member 120 may include a second agitating part 123. The second agitating part 123 may agitate the food while simultaneously rotating along the lateral surface 112 of the cooking container 110. For example, the second agitating part 123 may extend upward from the first agitating part 122 along the inner lateral surface 112 of the cooking container 110. In other words, the second agitating part 123 may extend upward from the edge region of the bottom surface 111 of the cooking container 110 along the inner lateral surface 112 of the cooking container 110. Therefore, the number of second agitating parts 123 may be identical to the number of first agitating parts 122.

For example, the second agitating part 123 may contact the inner lateral surface 112 of the cooking container 110. The second agitating part 123 contacting the inner lateral surface 112 may extend upward from the edge region of the first agitating part 122. As a result, the second agitating part 123 contacting the inner lateral surface 112 of the cooking container 110 may rotate in the cooking container 110. Accordingly, the second agitating part 123 may agitate solid food and liquid food in a manner that the solid and liquid foods are not attached to the inner lateral surface 112 of the cooking container 110, thereby cooking the solid and liquid foods.

The agitating member 120 may further include a third agitating part 125. The third agitating part 125 may connect the second agitating part 123 to the connection part 121. The third agitating part 124 may overlap the first agitating part 122 from a top view of the third agitating part 124. The third agitating part 125 may be located below a supporter 127 to be described later, and thus support the supporter 127. Optionally, the third agitating part 125 may not be provided to the agitating member 120.

The agitating member 120 may further include the supporter 127. The supporter 127 may adjust rotation of the agitating member 120 in a manner that the agitating member 120 can rotate with respect to the cooking container 110. For example, one end of the supporter 127 may be coupled to the connection part 121 of the agitating member 120, and the other end thereof may extend in the direction of one side surface. That is, from the top view of the supporter 127, one end of the supporter 127 may be coupled to the connection part 121, and the other end thereof may extend to the outer surface of the cooking container 110. In more detail, under the condition that one end of the supporter 127 is coupled to the groove 128 provided at the top surface of the connection part 121, some parts of the other end of the supporter 127 may be located at the outside of the cooking container 110 from the top view of the supporter 127.

The supporter 127 is coupled to the connection part 121, such that it can rotate along with the cooking container 110. The supporter 127 may rotate along with the cooking container 110 until the agitating member 120 perform relative rotation in the cooking container 110.

The agitating cooking assembly 100 may further include the stopper 130. The stopper 130 may be located at the rotation path of the agitating member 120, such that the agitating member 120 can rotate relatively to the cooking container 110. The stopper 130 may be located at the rotation path of the supporter 127.

Rotation of the supporter 127 may be restricted by the stopper 130 located at the rotation path of the supporter 127 while the supporter 127 rotates along with the cooking chamber 110. If the supporter 127 moves to a seating unit 135 (see FIG. 8) of the stopper 130, the supporter 127 may stop rotation of the agitating member 120 through the coupled connection part 121. As a result, the cooking chamber 110 may rotate, and the agitating member 120 may be provided at the stationary (or fixed) position. Therefore, the agitating member 120 may relatively rotate in the cooking container 110 with respect to the cooking chamber 110.

The agitating member according to another embodiment of the present disclosure will hereinafter be described.

FIG. 6 is a perspective view illustrating another example of the agitating member of the agitating cooking assembly shown in FIG. 2.

Referring to FIG. 6, the agitating member 160 may include a connection part 161, a first agitating part 162, a second agitating part 163, a third agitating part 165, a supporter 127, and a third agitating part 168. Compared with the agitating member 120 of FIG. 5, the agitating member 160 of FIG. 6 may further include the third agitating part 168, and the remaining constituent elements of FIG. 6 may be identical to those of FIG. 5. The agitating member 160 will hereinafter be described on the basis of the abovementioned difference.

The third agitating part 168 may extend from the connection part 161 to the side direction of the cooking container 110. The third agitating part 168 may be located to be symmetrical to the third agitating part 165 on the basis of the connection part 161. For example, the third agitating part 168 may include a horizontal part 168a extending in the opposite direction to the third agitating part 165, and a vertical part 168b extending from the horizontal part 168a in a downward direction. In this case, two or more vertical parts 168b may be used.

The agitating member 160 may agitate liquid foods located in close vicinity of the side surface 112 and the bottom surface 111 of the cooking container 110 during rotation of the first agitating part 162 and the second agitating part 163, and the third agitating part 168 may agitate solid foods. As a result, the agitating member 160 may allow liquid foods and/or solid foods to be easily agitated without replacement of the agitating member 160.

Another example of the agitating member according to the present disclosure will hereinafter be described.

FIG. 7 is a perspective view illustrating still another example of the agitating member of the agitating cooking assembly shown in FIG. 2.

Referring to FIG. 7, the agitating member 170 may include a connection part 171, an agitating part 173, and a supporter 177. Compared with the agitating member 120 of FIG. 5, the agitating member 160 may have a different agitating member 173, and the remaining constituent elements other than the agitating member 173 are identical to those of FIG. 5. The agitating member 160 will hereinafter be described on the basis of the above difference in which the agitating member 160 is different from the agitating member 120 of FIG. 5.

The agitating part 173 may extend in a semi-circular shape from the top view of the agitating part 173. The agitating part 173 may extend from one side of the connection part 171 to the edge region of the bottom surface 111 of the cooking container 110. As the distance from the connection part 171 to the edge region of the bottom surface 111 of the cooking container 110 is gradually increased, the height of the agitating part 173 is gradually lowered.

Referring back to FIGS. 1 to 3, the agitating cooking assembly 100 may include the stopper 130. The stopper 130 may be located at the rotation path of the supporter 127. For example, the stopper may be installed at one sidewall of the cooking chamber 20 so as to limit rotation of the supporter 127.

FIG. 8 is a view illustrating a stopper for use in the agitating cooking assembly shown in FIG. 2.

Referring to FIG. 8, the stopper 130 may include a seating part 135. The stopper 130 may include an inner space corresponding to the supporter 127, and include the seating part 135, one side of which is opened. The supporter 127 moves to the inside of the seating part 135 through the opened surface of the seating part 135, such that rotation of the supporter 127 may be limited.

The inner space of the seating part 135 may be larger than the volume of the supporter 127. As a result, under the condition that the supporter 127 is located at the seating part 135 so that rotation of the supporter 127 is limited, the supporter 127 can be easily separated from the seating part 135 when the rotation direction of the tray 40 is changed.

For example, the stopper 130 may include a first seating part 135a and a second seating part 135b. The first seating part 135a and the second seating part 135b may be located to face each other in the direction of a rotational radius. In more detail, one opened side of the first seating part 135a may face one opened side of the second seating part 135b. The stopper 130 may be located in a manner that the supporter 126 can move to the first seating part 135a or the second seating part 135b even when the supporter 125 rotates in a clockwise or counterclockwise direction. As a result, even when the rotation direction of the tray 40 is changed, rotation of the supporter 126 may be limited by the seating part 135.

Referring back to FIGS. 1 to 4, the agitating cooking assembly 100 may include legs 140. The legs 140 may be installed at the bottom surface of the cooking container 110. A plurality of legs 140 may be used. The legs 140 may be spaced apart from each other by a predetermined distance. The plurality of legs 140 may separate the cooking container 110 from the bottom surface of the cooking chamber 20.

For example, a lower end of each leg 140 may contact the guide part 43 of the tray 40. If the legs 140 are located over the tray 40, all the legs may contact the guide part 43 of the tray 40. As a result, when the legs are located over the tray 40, the cooking container 110 may be located at a predetermined position. In other words, if the agitating cooking assembly 100 is located in a manner that the legs 140 contact the guide part 43 of the tray 40, the cooking container 110 may always be provided at a constant position in the cooking chamber 20.

For example, a rubber 143 may be installed at the lower end of each leg 140. The rubber 143 contacts the top surface of the tray 40 so that frictional force to the tray 40 can be increased. As a result, the agitating cooking assembly 100 is not pushed from the tray 40, and may rotate with the tray 40.

Referring to FIG. 4, a tray seating part 145 may be provided at the bottom surface of each leg 140. The tray seating part 145 may be formed in a groove that is concave in the direction of the bottom surface to the upper part of each leg 140. The tray seating part 145 may allow the agitating cooking assembly 100 to be provided at a predetermined position within the cooking chamber 20. In more detail, if the guide part 43 of the tray 40 is located at each tray seating part 145 provided to the plurality of legs 140, the agitating cooking assembly 100 may be provided at a predetermined position within the cooking chamber 20. As a result, the agitating cooking assembly 100 may be seated at a specific position at which the agitating member 120 rotates and the supporter 127 can move into the tray seating part 145 of the stopper 130.

In addition, the tray seating part 145 may allow the agitating cooking assembly 100 to move to a specific position within the cooking chamber 20. For example, assuming that the guide part 43 of the tray 40 is not located in each tray seating part 145 provided in each leg 140, the agitating cooking assembly 100 rotates and at the same time moves in a manner that the guide part 43 of the tray 40 is located in the tray seating part 145. As a result, the agitating cooking assembly 100 may be located at a predetermined position on the tray although the user does not adjust the position of the agitating cooking assembly 100.

FIG. 9 is a perspective view illustrating a first modified example of the agitating cooking assembly according to an embodiment of the present disclosure. FIG. 10 is an exploded perspective view illustrating the agitating cooking assembly shown in FIG. 9.

Referring to FIGS. 9 and 10, the agitating cooking assembly 1100 may include a cooking container 1110, an agitating member 1120, and a stopper 1130.

The cooking container 1110 may include the space in which foods to be cooked by the cooking device 1 are stored. The cooking container 1110 may include a bottom surface 1111 and a side surface 1112 extending upward from the edge region of the bottom surface 1111. The bottom surface 1111 and the side surface 1112 may form the space in which foods are stored.

The bottom surface of the cooking container 1110 may be configured to have a flat surface. Compared with the agitating cooking assembly 100 of FIG. 2, the cooking container 1110 may not provide the protrusion part 115 at which the agitating member 1120 is fixed.

The agitating member 1120 may include a connection part 1121, a first agitating part 1122, a second agitating part 1123, a third agitating part 1125, a supporter 1127, and a forth agitating part 1129. Compared with the agitating member 160 of FIG. 6, but the connection part 1121 and the supporter 1127 of the agitating member 1120 are different from those of FIG. 6, the remaining constituent elements other than the connection part 1121 and the supporter 1127 may be identical to those of FIG. 6. Only some structures different from those of the agitating member 160 of FIG. 6 will hereinafter be described, and the remaining constituent elements other than the different structures will herein be omitted for convenience of description.

The connection part 1121 may be provided at the center part of the agitating member 1120. The connection part 1121 may be formed in a circular cone shape. The bottom surface of the connection part 1121 may be formed to have a flat surface in a different way from the agitating member 160 of FIG. 6.

The supporter 1127 may adjust rotation of the agitating member 120 in a manner that the agitating member 1120 may rotate relatively to the cooking container 1110. The supporter 1127 may be connected to the coupling part 1128 provided at the top surface of the connection part 1121. As a result, the supporter 1127 may rotate with the connection part 1121.

From the top view of the supporter 1127, the supporter 1127 may extend along the third agitating part 1125 and the forth agitating part 1129. From the top view of the supporter 1127, one side of the supporter 1127 may be formed to extend to the outside of the cooking container 1110 along the third agitating pat 1125. In addition, from the top view of the supporter 1127, the other side of the supporter 1127 may extend to the outside of the cooking container 1110 along the forth agitating part 1129. As described above, differently from the agitating member 160 of FIG. 6, plural parts extending to the outside of the cooking container 1110 may be used. During rotation of the supporter 1127, rotation of the supporter 1127 located at the rotation path of the supporter 1127 may be limited.

The stopper 1130 may be located at the rotation path of the supporter 1127. For example, the stopper 1130 may be installed at one sidewall of the cooking chamber 20. The stopper 1130 may be fixed to one sidewall of the cooking chamber 20, so that it may limit rotation of the supporter 1127.

The stopper 1130 may include a first stopper 1131 and a second stopper 1132. The first stopper 1131 and the second stopper 1132 may be located to face each other at the inner sidewall of the cooking chamber 20. Therefore, the first stopper 1131 and the second stopper 1132 may respectively limit rotation of one side of the supporter 1127 and rotation of the other side of the supporter 1127 extending outward from the cooking container 1110.

The stopper 1130 may include the seating part in the same manner as the stopper 130 of FIG. 8. The stopper 1130 may include the inner space corresponding to the supporter 1127, and may have the seating part, one side of which is opened. The supporter 1127 may move in the seating part through one opened surface of the seating part, such that rotation of the supporter 1127 may be limited.

Although not shown in the drawings, the agitating cooking assembly 1100 may further a third agitating member to support the cooking container 1110 and the agitating member 1120 in a manner that the supporter 1127 can be located at the same height as the stopper 1130 installed at the inner wall of the storage chamber 20. The third agitating member may allow the cooking container 1110 and the agitating member 1120 to be located at a predetermined height on the basis of the bottom surface of the cooking container 1110. As a result, the supporter 1127 contacts the stopper 1130 while simultaneously rotating along with the cooking container 1110, such that the supporter 1127 can relatively rotate in the cooking container 1110.

FIG. 11 is a front view illustrating a second modified example of the agitating cooking assembly according to an embodiment of the present disclosure. FIG. 12 is an exploded perspective view illustrating the agitating cooking assembly shown in FIG. 11.

Referring to FIGS. 11 and 12, the agitating cooking assembly 1200 may include a cooking container 1210, an agitating member 1220, a stopper 1230, and legs 1240. Compared with the agitating cooking assembly 100 of FIG.

2, the agitating cooking assembly 1200 has a different agitating member 1220 and a different stopper 1230, and the remaining constituent elements are identical to those of FIG. 2. The agitating cooking assembly 1200 will hereinafter be described on the basis of the difference between the agitating cooking assembly 1200 and the agitating cooking assembly 100 of FIG. 2.

The agitating member 1220 may include a connection part 1221, a first agitating part 1222, a second agitating part 1223, and a supporter 1227. The connection part 1221, the first agitating part 1222, and the second agitating part 1223 in the agitating member 1220 may be identical to the connection part 121, the first agitating part 122, and the second agitating part 123 in the agitating member 120 of FIG. 5. In contrast, the supporter 1227 may have a different structure than the supporter 127 of the agitating member 120 of FIG. 5. The agitating member 1220 will hereinafter be described on the basis of the difference between the agitating member 1220 and the agitating member 120 of FIG. 5.

The supporter 1227 may adjust rotation of the agitating member 1200 in a manner that the agitating member 1220 rotates relative to the cooking container 1210. For example, the supporter 1227 may include a supporter arm 1227*a* and a supporter engaging part 1227*b*.

One side of the supporter arm 1227*a* may be coupled to the connection part 1221, and the other side of the supporter arm 1227*a* may extend upward from the connection part 1221. The supporter arm 1227*a* may be coupled to the connection part 1221 in a manner that the supporter arm 1227*a* can rotate with the connection part 1221. The supporter arm 1227*a* may be coupled to the groove 1229 provided at the top of the connection part 1221.

The supporter engaging part 1227*b* may extend upward from one side of the upper part of the supporter arm 1227*a*. One side of the supporter engaging part 1227*b* is connected to the supporter arm 1227*a*, such that the supporter engaging part 1227*b* may rotate with the connection part 1221. One side of the supporter engaging part 1227*b* may be located at the same height as the stopper 1230. As a result, during rotation of the supporter engaging part 1227*b*, rotation of the supporter engaging part 1227*b* may be limited.

The agitating member 1220 may further include a third agitating part 1224. The third agitating part 124 may couple the connection part 1221 to the second agitating part 1223. The third agitating part 1225 may extend from the upper end of the second agitating part 1223 to the second agitating part 1223. The third agitating part 1224 may be parallel to the bottom surface 1211 of the cooking container 1210. From the top view of the third agitating part 1224, the third agitating part 1224 may be provided to overlap the first agitating part 1222.

The agitating member 1220 may allow the third agitating part 1228 to extend from the connection part 1221 to a side direction of the cooking container 1210. The third agitating part 1228 may be provided to be symmetrical to the third agitating part 1224 on the basis of the connection part 1221. For example, the third agitating part 1228 may include a horizontal part 1228 extending in the opposite direction of the third agitating part 165, and a vertical part 1228 extending downward from the horizontal part 1228*a*. In this case, two or more vertical parts 128*b* may be used. Optionally, the third agitating part 1228 may not be provided.

The stopper 1230 may be located in the rotation radius of the supporter 1227. Although the stopper 1230 has the same shape as the stopper 130 of FIG. 3, the position of the stopper 1230 installed in the cooking chamber 20 may be different from that of the stopper 130 of FIG. 3. The following embodiment will hereinafter be described on the basis of the difference between the stopper 1230 and the stopper 130 of FIG. 3.

The stopper 1230 may be installed at the top surface of the cooking chamber 1230. The stopper 1230 may be installed along the rotation radius of the supporter engaging part 1227*b* at the top surface of the cooking chamber 20, such that the stopper 1230 can limit rotation of the supporter engaging part 1227*b*. The stopper 1230 may limit rotation of the supporter engaging part 1227*b*, such that it can limit rotation of the agitating member 1220 connected to the supporter engaging part 1227*b*. Therefore, the stopper 1230 may allow the agitating member 1220 to perform relative rotation in the cooking container 1210.

FIGS. 13 to 16 are conceptual diagrams illustrating a method for allowing the agitating cooking assembly of FIG. 2 to agitate foods.

Referring to FIGS. 13 to 16, the agitating cooking assembly 100 according to one embodiment may agitate foods while simultaneously performing relative rotation in the cooking container 110 with respect to the cooking container 110. In more detail, the cooking container 110 may rotate with the tray 40, and rotation of the agitating member 120 may be limited by the stopper 130 configured to rotate with the cooking container 110. As a result, the agitating member 120 may perform relative rotation in the cooking container 110 with respect to the cooking container 110, such that foods stored in the cooking container 110 are agitated and then cooked.

In addition, the agitating cooking assembly 100 may cook foods using various shapes of the agitating member 120 according to foods types and cooking modes. For this purpose, the agitating member 120 may be detachably coupled to the cooking container 110. In more detail, when cooking liquid foods, the agitating member 120 located close to the bottom surface 111 and the side surface 112 of the cooking container 110 is provided, such that it can prevent the liquid foods from being attached to the bottom surface 111 and the side surface 112 of the cooking container 110.

The cooking device 1 may further include a controller 70 (see FIG. 2). The controller 70 may control rotational force generated from the drive member 50. Therefore, the controller 70 may adjust rotation of the tray 40.

In more detail, the controller 70 may adjust rotation of the tray 40 according to the food state, the cooking time, and the cooking mode. The controller 70 may control a rotation time, a rotation speed, and a rotation direction of the tray 40. If the user inputs the food state, the cooking time, and the cooking mode through the control panel 60, the controller 70 may control the rotation time, the rotation speed, and the rotation direction of the tray 40 in response to user selection. As a result, according to the cooking state and the cooking mode, the agitating member 120 for use in the agitating cooking assembly 100 may adjust the food agitating time, the rotation speed, the rotation direction, etc.

The agitating cooking assembly 100 and the cooking device 1 including the same according to the embodiment can agitate foods stored in the cooking container 110, and at the same time can rotate the cooking container 110 so as to cook the foods. As a result, the foods stored in the cooking container 110 can be cooked at a uniform temperature. In addition, since the cooking device 1 includes the above-mentioned agitating member 120, it can cook liquid foods (e.g., stews, rice porridge, and curry) to prevent the liquid foods from being attached to the bottom surface of the cooking container 110. As a result, the agitating cooking assembly 100 and the cooking device 1 including the same can improve cooking performance and can increase user convenience.

In more detail, as shown in FIG. 13, the cooking container 110 and the agitating member 120 can rotate in a clockwise direction. As shown in FIG. 14, the agitating member 120 may rotate with the cooking container 110, and the stopper 130 located in the rotation radius of the supporter 127 can limit rotation of the supporter 127. As a result, the agitating member 120 may be clogged with the stopper 130, such that it remains stopped and only the cooking container 110 can rotate in a clockwise direction. In this way, the agitating member 120 can rotate relative to the cooking container 110, and at the same time can agitate foods.

In contrast, as shown in FIG. 15, the cooking container 110 and the agitating member 120 may rotate in a counterclockwise direction. As shown in FIG. 16, when the agitating member 120 and the cooking container 110 rotate simultaneously, the stopper 130 located in the rotation radius of the supporter 127 may limit rotation of the supporter 127. As a result, the agitating member 120 is clogged with the stopper 130 and remains stopped, and only the cooking container 110 may rotate in a counterclockwise direction. In this way, the agitating member 120 may cook the foods while simultaneously rotating with respect to the cooking container 110.

The agitating cooking assembly 200 according to another embodiment will hereinafter be described.

FIG. 17 is a perspective view illustrating a cooking device according to another embodiment of the present disclosure. FIG. 18 is a front view illustrating one example of the agitating cooking assembly of the cooking device shown in FIG. 17.

Referring to FIGS. 17 and 18, the cooking device 2 according to another embodiment may include a main body 10, a cooking chamber 20, a door 30, a heating unit (not shown), a drive member 50, a control panel 60, and an agitating cooking assembly 200. Compared with the cooking device 1 of FIG. 1, the cooking device 2 does not provide the tray 40, and includes the agitating cooking assembly 200 different from that of FIG. 1. The cooking device 2 of FIGS. 17 and 18 will hereinafter be described on the basis of the difference between the cooking device 2 and the cooking device 1 of FIG. 1.

The agitating cooking assembly 200 according to another embodiment of the present disclosure will hereinafter be described.

FIG. 19 is an exploded perspective view illustrating one example of the agitating cooking assembly of the cooking device shown in FIG. 17. FIG. 20 is a cross-sectional view illustrating the agitating cooking assembly shown in FIG. 18. FIG. 21 is an enlarged view illustrating the region "A" of the agitating cooking assembly shown in FIG. 20.

Referring to FIGS. 19 to 21, the agitating cooking assembly 200 may include a cooking container 210, an agitating member 220, a rotation transfer unit 230, a housing 240, a ball bearing 250, and legs 260.

The cooking container 210 may include the space in which foods to be cooked by the cooking device 2 are stored. The cooking container 210 may include a bottom surface 211 and a side surface 210 extending upward from the edge region of the bottom surface 211. The bottom surface 211 and the side surface 212 may form the space in which foods are stored.

For example, the cooking container 210 may include a protrusion part 213 located at the center region of the bottom surface 211. The protrusion part 213 may be coupled to some parts of the agitating member 220 so that the cooking container 210 can be connected to the agitating member 220. In addition, the protrusion part 213 may allow the agitating member 220 to relatively rotate about the protrusion part 213 with respect to the cooking container 210.

For example, the protrusion part 213 may be formed in a cylindrical shape. A cross-sectional view of the protrusion part 213 may be gradually reduced in an upward direction thereof. In contrast, the protrusion part 213 may also be formed in a cylindrical shape having the same cross-section.

For example, a hole 214 may be provided at the top of the protrusion part 213. The hole 214 may be used as a passage through which the cooking container 210 passes, such that some parts of the rotation transfer unit 230 can be connected to the agitating member 220.

For example, a lower cover 215 may be coupled to the bottom surface of the cooking container 210. The lower cover 215 may connect the cooking container 210 to the rotation transfer unit 230, and may transmit rotational force received from the rotation transfer unit 230 to the cooking container 210. The lower cover 215 may be screwed onto the rotation transfer unit 230. Optionally, the lower cover 210 may not be provided.

FIG. 22 is a view illustrating an agitating member of the agitating cooking assembly shown in FIG. 18.

Referring to FIG. 22, the agitating member 220 according to another embodiment may include a connection part 221, agitating parts (222, 223), and a rotation-shaft coupling part 225.

The connection part 221 may be coupled to one side of the cooking container 210. In more detail, the connection part 221 may be rotatably coupled to the protrusion part 213 of the cooking container 210.

For example, an insertion groove 229 may be provided at the bottom surface of the connection part 221. The insertion groove 229 may be formed to have a shape corresponding to the protrusion part 213 in such a manner that the protrusion part 213 is inserted into the insertion groove 229 and coupled to the insertion groove 229. The connection part 221 may be detachably coupled to the protrusion part 213. Therefore, the agitating member 220 may be replaced with agitating members having various shapes by user selection according to food types, cook types, etc. such that it can be used to cook foods.

The agitating parts (222, 223) may be coupled to the connection part 221, and may rotate with the connection part 221 such that the agitating parts (222, 223) may agitate foods stored in the cooking container 210. For example, the agitating parts (222, 223) may be formed to extend from the connection part to the edge region of the bottom surface 211 of the cooking container 210. In other words, the agitating parts (222, 223) may extend from the center region of the bottom surface 211 of the cooking container 210 to the edge region in the radial direction of the cooking container 210.

A plurality of agitating parts (222, 223) may be used. For example, the agitating parts (222, 223) may be provided to both sides on the basis of the connection part 221. Although not shown in the drawings, two or more agitating parts (222, 223) may be used, and the respective agitating parts (222, 223) may be spaced apart from each other by a predetermined distance.

Referring to FIGS. 20 and 21, the agitating parts (222, 223) may contact the bottom surface of the cooking container 210. The agitating parts (222, 223) may contact the bottom surface of the cooking container 210 so that agitating parts (222, 223) can relatively rotate with respect to the cooking container 210. As a result, even when the agitating member 220 cooks not only solid foods but also liquid foods, the agitating parts (222, 223) agitate and cook the foods to prevent the foods from being attached to the bottom surface of the cooking container 210.

For example, the agitating parts (222, 223) may be formed in a tilted shape in a manner that the agitating parts (222, 223) are gradually increased in height in proportion to the increasing distance from each of both sides of the agitating parts (222, 223) to the center part. In other words, the agitating parts (222, 223) may have a triangular cross-sectional view, and may extend from the connection part 221 to the edge region of the bottom surface of the cooking container 210. In this case, the agitating parts (222, 223) may have a symmetrical shape on the basis of the center part. In more detail, the center part of the agitating parts (222, 223) may have a second height (h2). In this case, the second height (h2) may be 4 mm to 5 mm.

A rotation-shaft coupling part 225 may be provided over the connection part 221. The rotation-shaft coupling part may be coupled to some parts of the rotation transfer unit 230, and may receive rotational force from the rotation transfer unit 230.

The rotation-shaft coupling part 225 may protrude upward from the top surface of the connection part 221. The rotation-shaft coupling part 225 may be formed in a pillar shape having a plurality of edges. For example, the rotation-shaft coupling part 225 may be formed in a square pillar shape. As a result, when some parts of the rotation transfer unit 230 rotate while simultaneously being inserted into the rotation-shaft coupling part 225, the rotation-shaft coupling part 225 may easily receive rotational force. The rotation-shaft transfer unit 230 includes an inner groove 225a through which some parts of the rotation transfer unit 230 can be coupled to the inside of the rotation-shaft coupling part 225. The inner groove 225a may be connected to the insertion groove 229. Some parts of the rotation transfer unit 230 may be inserted into the inner groove 225a, and may transfer rotational force from the rotation transfer unit 230 to the agitating member 220. As a result, the agitating member 220 may rotate with the rotation transfer unit 230.

FIG. 23 is a conceptual diagram illustrating that a rotation transfer unit of the agitating cooking assembly shown in FIG. 18 is connected to the cooking container and the agitating member. FIG. 24 is a conceptual diagram illustrating the operation of a rotation transfer unit for use in the agitating cooking assembly shown in FIG. 18. FIG. 25 is a conceptual diagram illustrating a method for allowing the agitating cooking assembly of FIG. 18 to agitate foods.

Referring to FIGS. 23 to 25, the rotation transfer unit 230 may be located below the cooking container 210. The rotation transfer unit 230 may transfer rotational force to each of the cooking container 210 and the agitating member 220. For example, the rotation transfer unit 230 may transmit rotational force having different directions to the cooking container 210 and the cooking container 220, respectively.

For example, the rotation transfer unit 230 may include a rotation shaft 231, a first gear 233, a second gear 235, and a ring gear 237.

One end of the rotation shaft 231 may be connected to the drive member 50 such that the rotation shaft 231 can rotate. A coupler 231a may be installed at the lower end of the rotation shaft 231, and may be coupled to the drive member 50. As a result, the rotation shaft 231 may rotate in the same direction as the rotation direction of the drive member 50.

The upper end of the rotation shaft 231 may be connected to the agitating member 220. In more detail, the upper end of the rotation shaft 231 may be inserted into the inner groove 223 of the agitating member 220. For this purpose, the rotation shaft 231 may be inserted into the inner groove 223 after passing through the hole 214 of the protrusion part 213 of the cooking container 210. The agitating member 220 is directly coupled to the rotation shaft 231 so that the agitating member 220 can rotate in the same direction as in the rotation shaft 231.

The first gear 233 may have a hollow, and the rotation shaft 231 may be coupled to the hollow. The first gear 233 may rotate upon receiving rotational force from the rotation shaft 231.

The second gear 235 may be disposed between the first gear 233 and the ring gear 237. One end of the second gear 235 may be meshed with the first gear 233, and the other end of the second gear 235 may be meshed with the ring gear 237. As a result, the second gear may transfer rotational force of the first gear 233 to the ring gear 237. Referring to FIG. 24, the second gear 235 may transfer rotational force generated in the direction opposite to the rotation direction the first gear 233 to the ring gear 237.

The ring gear 237 may be formed in a ring shape having a hollow, and may include teeth in the inner sidewall. The teeth installed in the inner sidewall may be meshed with teeth of the second gear 235. As a result, the ring gear 237 may receive rotational force from the second gear 235.

The ring gear 237 may be coupled to the bottom surface of the cooking container 210. For example, the ring gear 237 may be coupled to the bottom surface of the lower cover 215. The ring gear 237 may transfer rotational force to the cooking container 210 through the lower cover 215. In this case, as shown in FIG. 19, the cooking container 210 may receive rotational force opposite to the other rotational force directly transferred to the agitating member 220 through the rotation shaft 231 from the ring gear 237 through the rotation shaft 231. Therefore, the rotational transfer unit 230 may transmit rotational force to the cooking container 210 and the agitating member 220, such that the agitating member 220 can relatively rotate in the cooking container 210 with respect to the cooking container 210.

Referring back to FIGS. 19 to 21, the housing 240 may include the inner space in which gears (233, 235, 237) of the rotation transfer unit 230 are located. For example, the housing 240 may include an upper housing 241 and a lower housing 243.

The upper housing 241 may be located in a hollow of the ring gear 237. For this purpose, the upper housing 241 may include the space in which the second gear 235 can be located at one side of the upper housing 241.

The lower housing 243 may be larger in size than the outer surface of the ring gear 237. In other words, the lower housing 243 may have a diameter larger than a diameter of the outer surface of the ring gear 237, and the first gear 233, the second gear 235, and the ring gear 237 may be located in the lower housing 243.

The ball bearing 250 may reduce frictional force in a manner that the cooking container 210 can easily rotate at the upper part of the housing 240. The ball bearing 250 may be installed at the housing 240 in a manner that the ball 251 can contact the lower cover 215 of the cooking container 210. In more detail, the ball bearing 250 may be installed at the lower housing 243, and the ball 251 may contact the lower cover 215 through the hall 241a installed in the lower housing 241. The ball 251 rotates along with the lower cover 215, resulting in reduction of frictional force of the lower cover 215.

The legs 260 may be installed below the cooking container 210, and may separate the cooking container 210 from the bottom surface. For example, the legs 260 may be installed at the bottom surface of the lower cover 215. In addition, one or more legs 260 may be used, and the plurality of legs 260 may be spaced apart from each other by a predetermined distance. A rubber 261 may be installed at the lower end of the legs 260.

The agitating cooking assembly 200 according to another embodiment of the present disclosure can relatively rotate in the cooking container 210 with respect to the cooking container 210, such that it can agitate the foods. In more detail, the agitating member 220 may rotate in one direction along with the rotation shaft 231, and the cooking container 210 may rotate along with the ring gear 237 in the opposite direction of the agitating member 220. As described above, the agitating member 220 may relatively rotate in the cooking container 210 with respect to the cooking container 210. As a result, the agitating member 220 may rotate and cook the foods stored in the cooking container 210.

In addition, the agitating cooking assembly 200 may cook the foods using various shapes of agitating members 220 according to the food type and the cooking mode. For this purpose, the agitating member 220 may be detachably coupled to the cooking container 210. In more detail, when cooking liquid foods, the agitating member 220 located close to the bottom surface 211 of the cooking container 210 can prevent the liquid foods from being attached to the bottom surface 211 of the cooking container 210.

The cooking container 2 may further include a controller 70. The controller 70 may control rotational force generated from the drive member 50. Therefore, the controller 70 may control rotation of the rotation transfer unit 230.

In more detail, the controller 70 may control rotation of the rotation transfer unit 230 according to the food state, the cooking time, and the cooking mode. The controller 70 may control the rotation time and the rotation speed, etc. of the rotation transfer unit 230. If the user inputs the food state, the cooking time, and the cooking mode through the control panel 60, the controller 70 may control the rotation time, the rotation speed, etc. of the rotation transfer unit 230 according to user selection. As a result, the agitating member 220 of the agitating cooking assembly 200 may control the food agitating time and the rotation speed according to the food state, the cooking mode, etc.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cooking device comprising:
a cooking chamber configured to provide a space in which food is cooked;
a tray located at a bottom surface of the cooking chamber, and connected to a drive member generating rotational force; and
an agitating cooking assembly supported by the tray and rotatable with the tray,
wherein the agitating cooking assembly includes:
a cooking container configured to store food therein;
an agitating member rotatably connected to the cooking container and rotatable with the tray relative to a sidewall of the cooking chamber, extending from an axis of rotation of the cooking container and having a length less than a shortest distance from the axis of rotation of the cooking container to a sidewall of the cooking chamber in a direction of extension of the agitating member, and configured to agitate the food while simultaneously relatively rotating in the cooking container with respect to the cooking container; and
a stopper located at a rotation path of the agitating member in a manner that the agitating member relatively rotates with respect to the cooking container.

2. The cooking device according to claim 1, wherein the agitating member includes:
a connection part connected to one side of the cooking container; and
a first agitating part configured to extend from the connection part to an edge region of a bottom surface of the cooking container.

3. The cooking device according to claim 2, wherein:
the cooking container includes a protrusion part installed at a center region of the bottom surface;
the connection part includes an insertion groove shaped in response to the protrusion part at a bottom surface of the connection part; and
the protrusion part is inserted into the insertion groove such that the agitating member relatively rotates with respect to the cooking container.

4. The cooking device according to claim 2, wherein the first agitating part is configured to contact the bottom surface of the cooking container.

5. The cooking device according to claim 2, wherein the first agitating part is formed in a tilted shape in a manner that the first agitating part is increased in height in proportion to the increasing distance from both sides of the first agitating part to a center part of the first agitating part.

6. The cooking device according to claim 5, wherein the agitating member further includes:
a second agitating part configured to extend upward from the first agitating part along an inner side surface of the cooking container.

7. The cooking device according to claim 6, wherein the agitating member further includes:
a supporter, one side of which is coupled to the connection part and the other side extends to one side surface of the cooking chamber,
wherein the stopper is located at a rotation path of the supporter.

8. The cooking device according to claim 7, wherein the stopper, one side of which is installed at one sidewall of the cooking chamber and the other side is located at a rotation path of the supporter, is provided.

9. The cooking device according to claim 8, wherein the agitating member further includes:
a third agitating part configured to connect the second agitating part to the connection part so as to support the supporter.

10. The cooking device according to claim 7, wherein:
the stopper includes a seating part in which some parts of the supporter are seated,
wherein the seating part includes an inner space corresponding to the supporter, and one side surface of the inner space is formed to be opened.

11. The cooking device according to claim 1, wherein the agitating cooking assembly further includes:
a plurality of legs installed at a bottom surface of the cooking container so as to support the cooking container.

12. The cooking device according to claim 11, wherein:
the tray includes a guide part in an edge region;
each of the legs includes a tray seating part concaved upward at a bottom surface of each leg; and
each of the legs is provided in a manner that the guide part is located in the tray seating part.

13. The cooking device according to claim 1, wherein the agitating member is detachably coupled to the cooking container.

14. The cooking device according to claim 1, wherein:
the cooking device further includes a controller configured to adjust rotation of the tray,
wherein the controller controls a rotation speed and a rotation time of the tray.

15. An agitating cooking assembly comprising:
a cooking container configured to include a space in which food is stored, and receive an external rotational force;
an agitating member rotatably connected to the cooking container, extending from an axis of rotation of the cooking container and having a length less than a shortest distance from the axis of rotation of the cooking container to a sidewall of a cooking chamber in a direction of extension of the agitating member, and configured to relatively rotate in the cooking container with respect to the cooking container so as to agitate the food; and
a stopper located in a rotation path of the agitating member so as to limit rotation of the agitating member.

16. The agitating cooking assembly according to claim 15, wherein the agitating member includes:
a connection part connected to one side of the cooking container; and
a first agitating part configured to extend from the connection part to an edge region of a bottom surface of the cooking container.

17. The agitating cooking assembly according to claim 16, wherein:
the cooking container includes a protrusion part installed at a center region of the bottom surface;
the connection part includes an insertion groove shaped in response to the protrusion part at a bottom surface of the connection part; and
the protrusion part is inserted into the insertion groove such that the agitating member relatively rotates with respect to the cooking container.

18. An agitating cooking assembly for a cooking apparatus, the agitating cooking assembly comprising:
a cooking container configured to be placed in a cooking chamber of the cooking apparatus and receive a rotational force from the cooking apparatus;
an agitating member configured to:
be rotatably connected to the cooking container in the cooking chamber,
extend from an axis of rotation of the cooking container towards a sidewall of the cooking chamber,
have a length less than a shortest distance from the axis of rotation of the cooking container to the sidewall of the cooking chamber in a direction of extension of the agitating member, and
rotate in the cooking container along a rotation path relative to the cooking container and the sidewall of the cooking chamber due to the rotational force from the cooking apparatus; and
a stopper configured to be provided in the rotation path of the agitating member to limit a rotation of the agitating member in a first direction of the rotational force while allowing a rotation of the agitating member in a second direction opposite to the first direction of the rotational force.

* * * * *